United States Patent
Lu et al.

(10) Patent No.: US 10,393,901 B2
(45) Date of Patent: Aug. 27, 2019

(54) WAVEFIELD INTERPOLATION AND REGULARIZATION IN IMAGING OF MULTIPLE REFLECTION ENERGY

(71) Applicant: PGS Geophysical AS, Oslo (NO)

(72) Inventors: Shaoping Lu, Houston, TX (US); Norman Daniel Whitmore, Jr., Houston, TX (US); Alejandro Antonio Valenciano Mavilio, Houston, TX (US); Nizar Chemingui, Houston, TX (US)

(73) Assignee: PGS Geophysical AS, Oslo (NO)

( * ) Notice: Subject to any disclaimer, the term of this patent is extended or adjusted under 35 U.S.C. 154(b) by 83 days.

(21) Appl. No.: 15/238,460

(22) Filed: Aug. 16, 2016

(65) Prior Publication Data

US 2017/0059730 A1   Mar. 2, 2017

Related U.S. Application Data

(60) Provisional application No. 62/211,966, filed on Aug. 31, 2015.

(51) Int. Cl.
*G01V 1/32* (2006.01)
*G01V 1/36* (2006.01)
*G01V 1/38* (2006.01)

(52) U.S. Cl.
CPC .......... *G01V 1/36* (2013.01); *G01V 1/32* (2013.01); *G01V 1/364* (2013.01); *G01V 1/38* (2013.01);
(Continued)

(58) Field of Classification Search
None
See application file for complete search history.

(56) References Cited

U.S. PATENT DOCUMENTS

2010/0002541 A1   1/2010   Ozdemir et al.
2013/0208565 A1   8/2013   Orji et al.
(Continued)

FOREIGN PATENT DOCUMENTS

GB   2395559 A   5/2004

OTHER PUBLICATIONS

Muijs, Remco, et al., "Prestack depth migration of primary and surface-related multiple reflections: Part I—Imaging," Geophysics, vol. 72, No. 2 Mar.-Apr. 2007, pp. S59-S69.
(Continued)

*Primary Examiner* — Roy Y Yi
*Assistant Examiner* — Geoffrey T Evans

(57) ABSTRACT

Methods and systems of generating seismic images from primaries and multiples are described. Methods separate pressure data into up-going pressure data and down-going pressure data from pressure data and vertical velocity data. Irregularly spaced receiver coordinates of the down-going and up-going pressure data are regularized to grid points of a migration grid and interpolation is used to fill in down-going and up-going pressure data at grid points of the migration grid. A seismic image is calculated at grid points of the migration grid based on the interpolated and regularized down-going pressure data and the interpolated and regularized up-going pressure data. The seismic images are high-resolution, have lower signal-to-noise ratio than seismic images generated by other methods, and have reduced acquisition artifacts and crosstalk effects.

16 Claims, 25 Drawing Sheets

(52) U.S. Cl.
CPC .......... *G01V 2210/144* (2013.01); *G01V 2210/1423* (2013.01); *G01V 2210/24* (2013.01); *G01V 2210/44* (2013.01); *G01V 2210/45* (2013.01); *G01V 2210/56* (2013.01); *G01V 2210/57* (2013.01)

(56) References Cited

U.S. PATENT DOCUMENTS

| | | |
|---|---|---|
| 2013/0258565 A1 | 10/2013 | Nishi |
| 2014/0119157 A1 | 5/2014 | Whitmore, Jr. et al. |
| 2014/0140171 A1 | 5/2014 | Sollner |
| 2015/0212222 A1 | 7/2015 | Poole |
| 2015/0301209 A1* | 10/2015 | Yarman ............ G01V 1/30 702/17 |
| 2018/0267188 A1* | 9/2018 | Turquais ........... G01V 1/345 |

OTHER PUBLICATIONS

European Search Report, Application No. 16186619.9, dated Jan. 4, 2017, search completed Dec. 22, 2016.
Claerbout, Jon F., "Toward a Unified Theory of Reflector Mapping," Geophysics, vol. 36, No. 3, Jun. 1971, pp. 467-481.
Whitmore, N.D., et al., "Imaging of primaries and multiples using a dual-sensor towed streamer," SEG Denver 2010 Annual Meeting, pp. 3187-3192.
Berkhout, A.J., et al., "Multiple technology: Part 2, Migration of multiple reflections," Sep. 28, 2015.
Lu, Shaoping, et al., "Crosstalk Attenuation for Seismic Imaging," U.S. Appl. No. 14/991,416, filed Jan. 8, 2016.

* cited by examiner

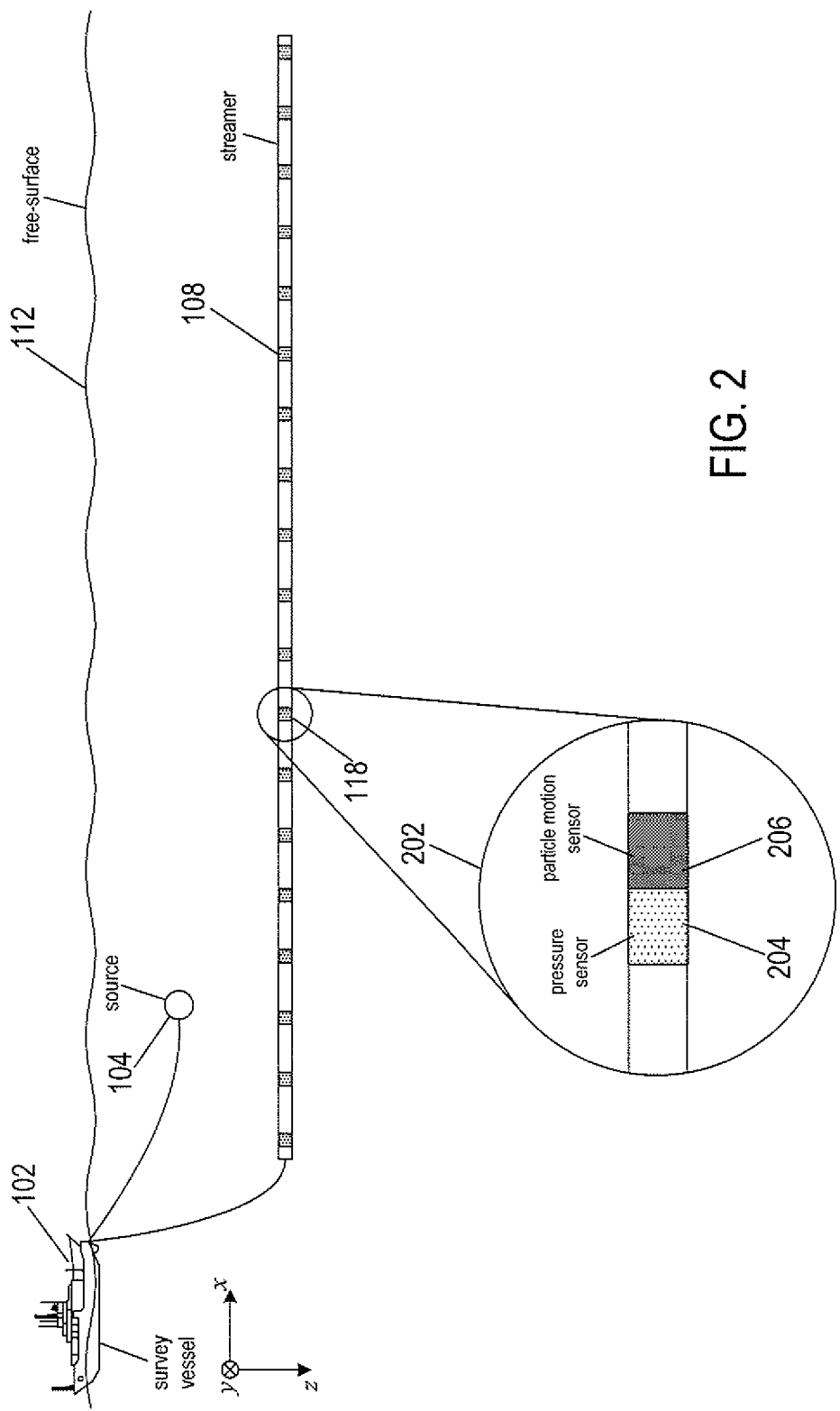

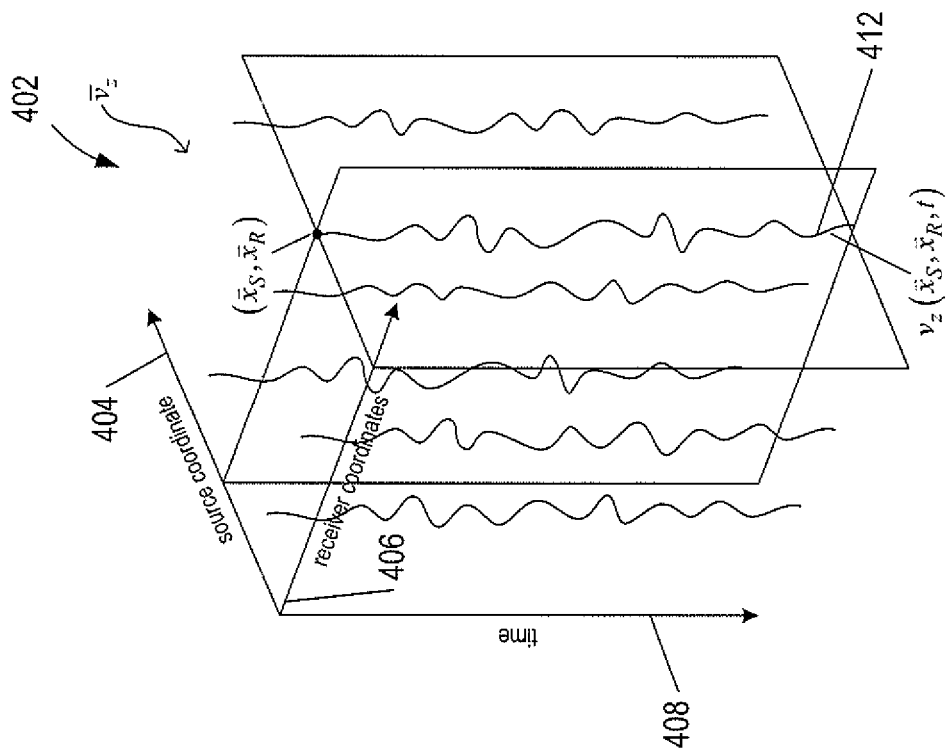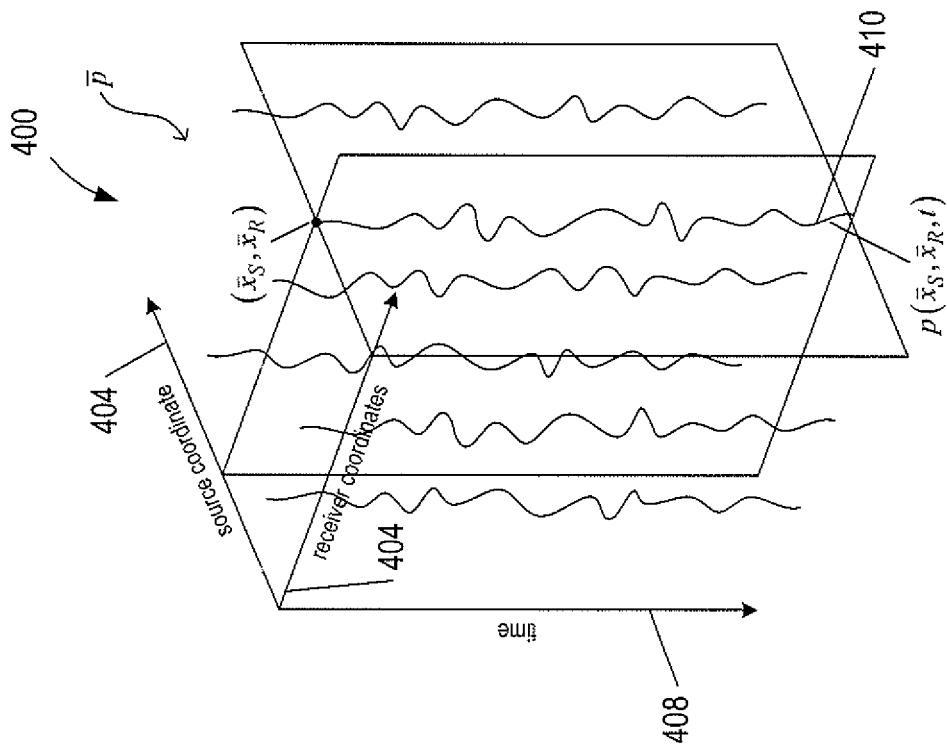
FIG. 4

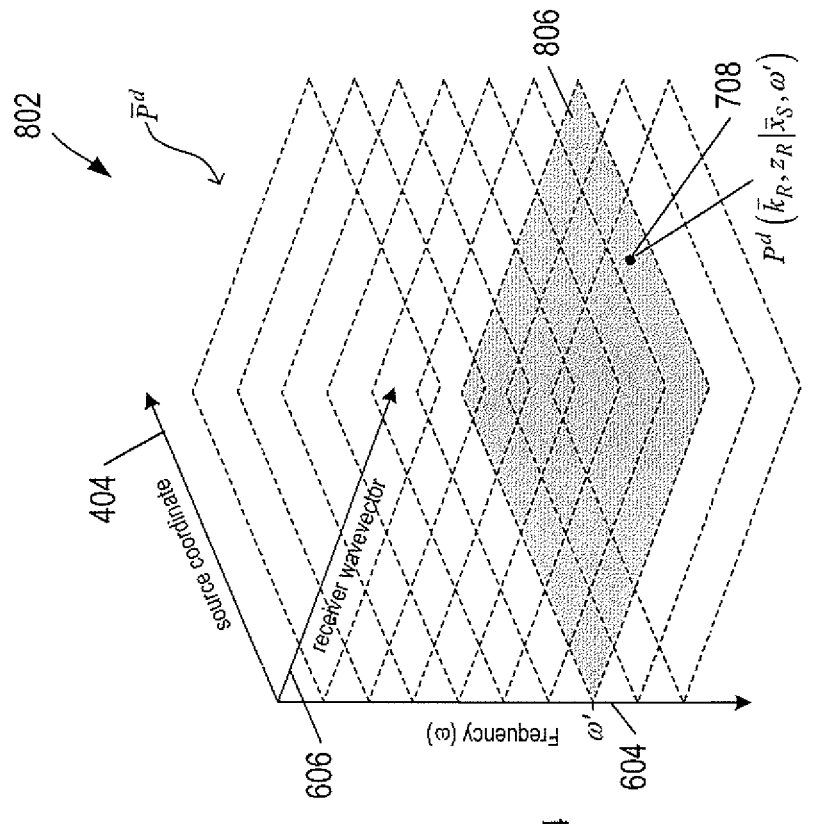
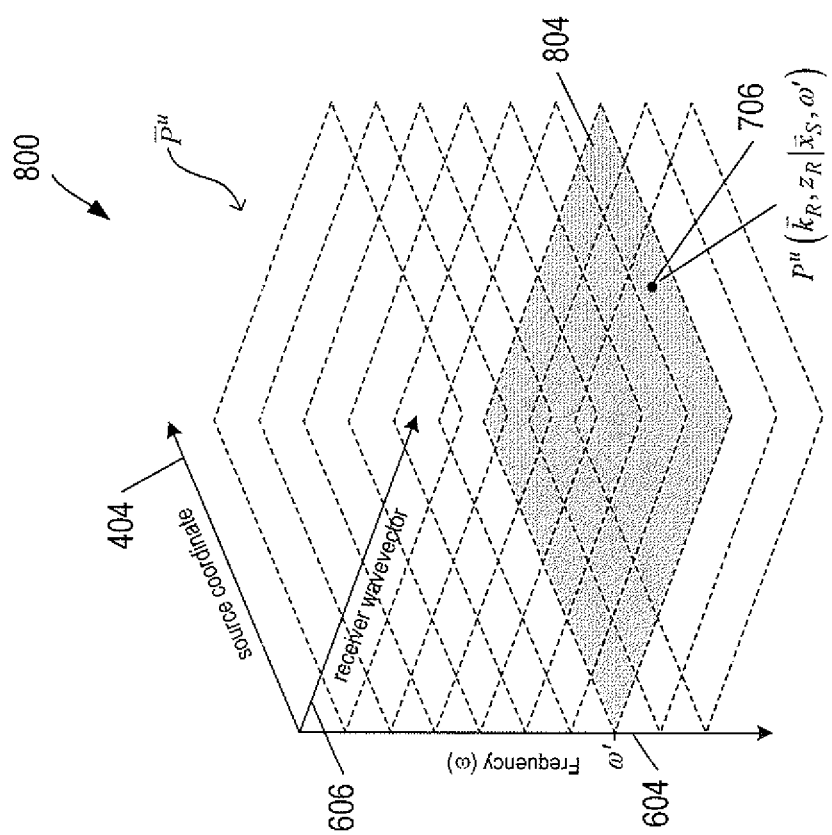
FIG. 8

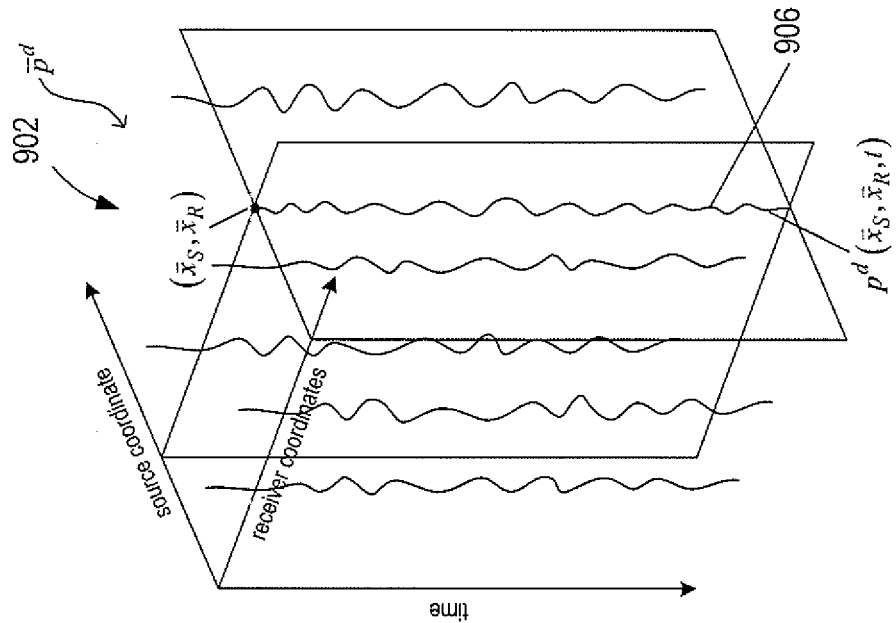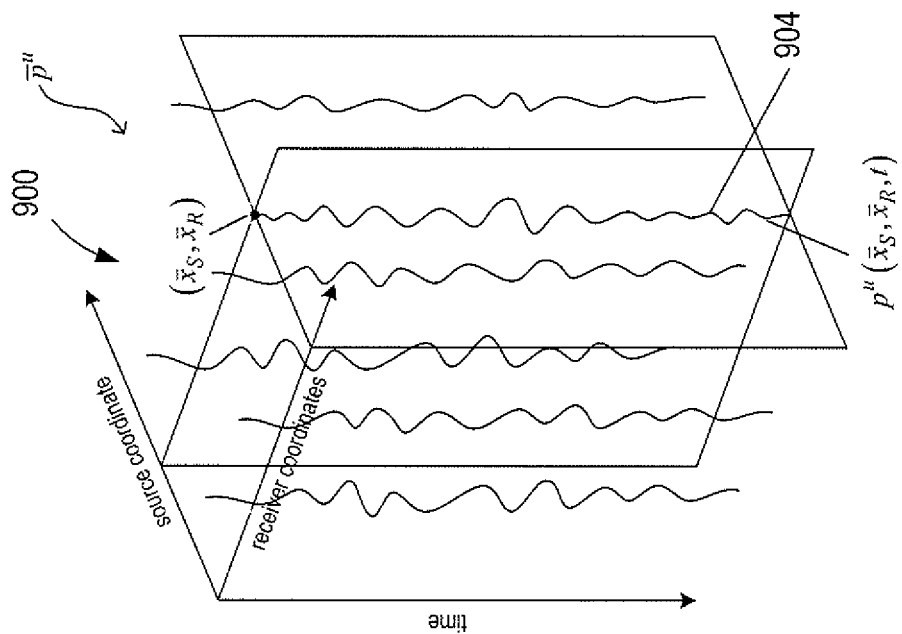
FIG. 9

WAVEFIELD INTERPOLATION AND REGULARIZATION IN IMAGING OF MULTIPLE REFLECTION ENERGY

CROSS-REFERENCE TO A RELATED APPLICATION

This application claims the benefit of Provisional Application 62/211,966, filed Aug. 31, 2015.

BACKGROUND

Marine seismology companies invest heavily in the development of marine seismic surveying equipment and seismic data processing techniques in order to obtain accurate, high-resolution seismic images of subterranean formations located beneath a body of water. High-resolution seismic images are used to determine the structure of subterranean formations, discover hydrocarbon deposits, and monitor hydrocarbon deposits during production. A typical marine seismic survey is carried out with a survey vessel that tows one or two seismic sources and a number of streamers below the surface of the body of water. A typical seismic source comprises an array of source elements, such as air guns. The streamers are elongated cable-like structures towed behind the survey vessel in the direction the survey vessel is traveling. Each streamer includes a number of receivers that generate seismic data in response to detecting pressure and/or particle motion wavefields. The streamers are arranged substantially parallel to one another to form a seismic data acquisition system. The survey vessel contains seismic acquisition equipment, such as navigation control, seismic source control, seismic receiver control, and seismic data recording equipment.

A typical marine seismic survey is carried out by activating the one or more seismic sources above a subterranean formation. Each activation produces an acoustic signal that expands outward in all directions. A portion of the acoustic signal travels downward through the body of water and into the subterranean formation. At each interface between different types of rock and sediment, a portion of the acoustic signal is refracted, a portion is transmitted, and another portion is reflected back from each interface into the body of water to propagate toward the free surface. The portion of the acoustic signal reflected back into the body of water and that travels directly to the receivers is called a primary reflected wavefield or simply a primary. Other portions of the acoustic signal that is reflected back into the body of water may be reflected a number of times between the free surface and between interfaces within the subterranean formation before reaching the receivers. These multiple reflected wavefields are called multiples. Multiples are typically treated as noise and are suppressed in seismic imaging. In recent years, multiples have been recognized as containing valuable information about the subterranean formation. As a result, techniques have been developed to generate seismic images from both primaries and multiples. However, the resulting seismic images typically have a low signal-to-noise ratio and are often contaminated with adverse crosstalk effects, which lowers the resolution of the seismic images.

DESCRIPTION OF THE DRAWINGS

FIG. 2 shows a side-elevation view of a seismic data acquisition system with a magnified view of a receiver.

FIG. 4 shows a set of pressure data and a set of vertical velocity data.

FIG. 8 shows a set of up-going pressure data and a set of down-going pressure data in the wavenumber-frequency domain.

FIG. 9 shows a set of up-going going pressure data and a set of down-going pressure data in a space-time domain.

DETAILED DESCRIPTION

This disclosure presents methods and systems of generating a seismic image of a subterranean formation using primaries and multiples. A set of pressure data and a set of vertical velocity data are generated by collocated pressure and particle motion sensors of streamers for one or more activations of one or more sources. The vertical velocity data is used to separate the pressure data into up-going pressure data and down-going pressure data. Irregularly spaced receiver coordinates of the down-going pressure data are regularized to grid points of a migration grid and down-going pressure data is interpolated at grid points of the migration grid. Irregularly spaced receiver coordinates of the up-going pressure data are also regularized to grid points of the same migration grid and up-going pressure data is also interpolated at grid points of the migration grid. Methods described below generate a high-resolution seismic image at grid points of the migration grid based on the interpolated and regularized up-going and down-going pressure data. The seismic image has a higher signal-to-noise ratio and fewer adverse acquisition and crosstalk effects than a similar seismic image generated by other methods. In other words, by regularizing and interpolating both the down-going and up-going pressure wavefields before imaging, the signal-to-noise ratio may be increased and many adverse acquisition and crosstalk effects are reduced.

Figure 1A:
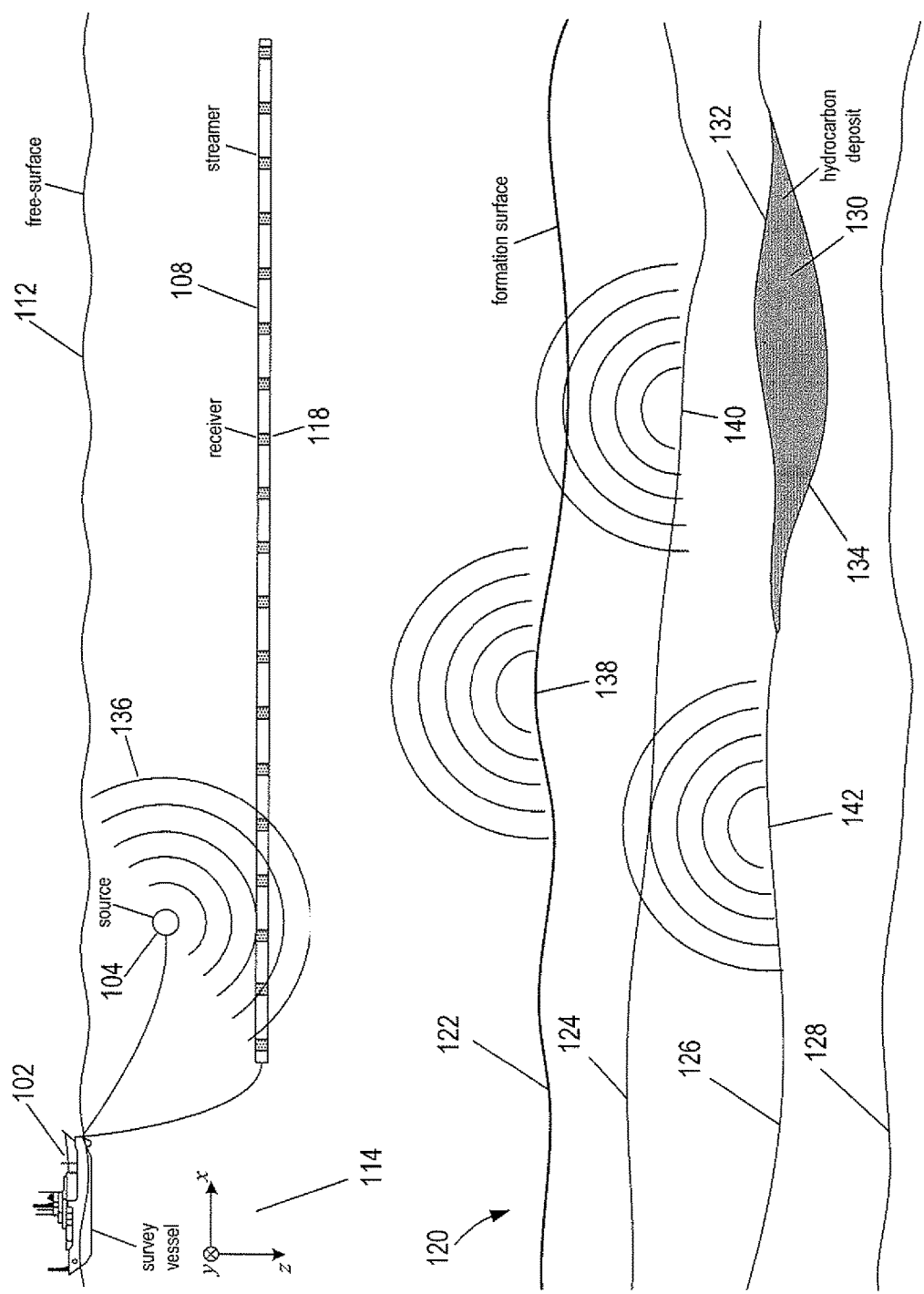
FIGS. 1A-1B show side-elevation and top views of an example seismic data acquisition system.
Figure 1B:
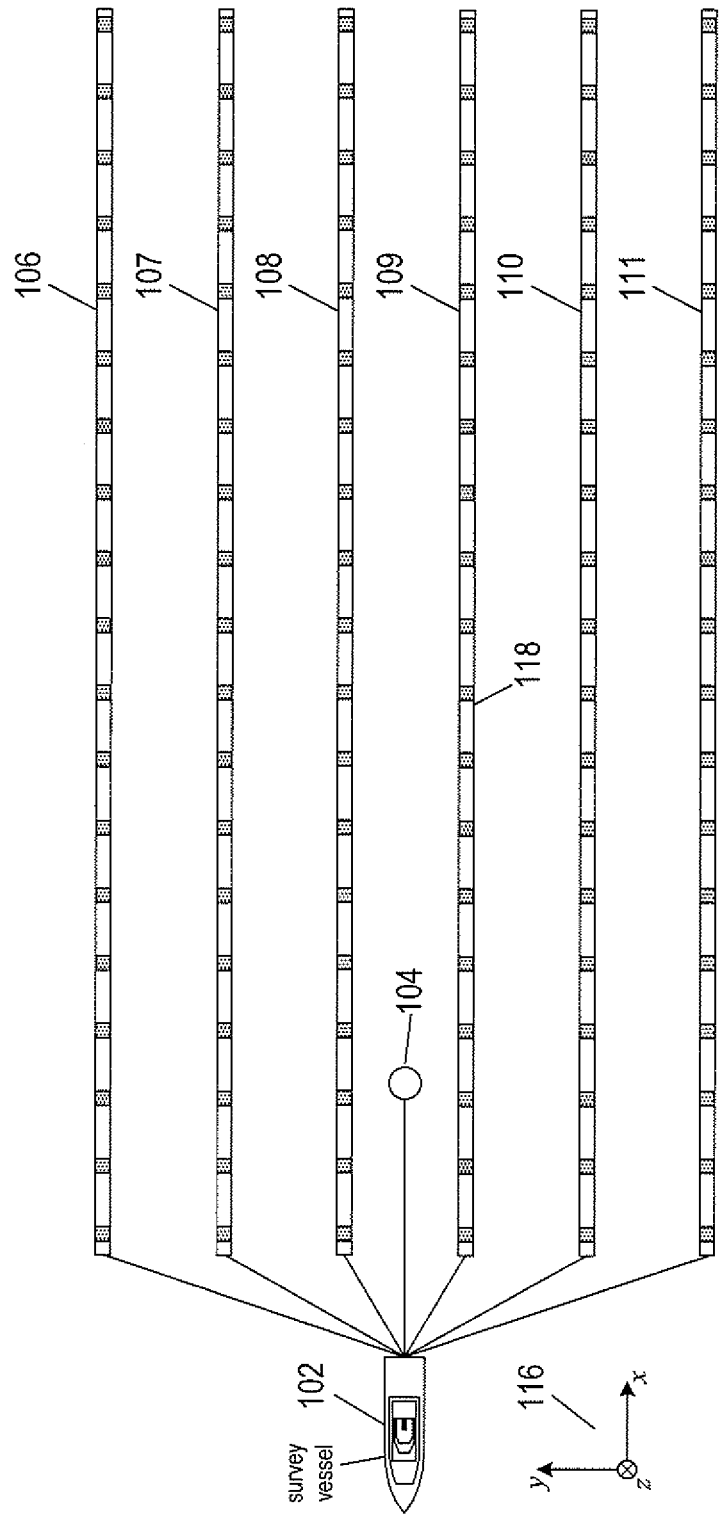

FIGS. 1A-1B show side-elevation and top views, respectively, of an example seismic data acquisition system that comprises a survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form an ideally planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and approximately parallel to the free surface 112, in practice, the towed streamers may undulate because of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. The source 104 comprises an array of source elements, such as air guns or the source 104 may be a marine vibrator.

FIG. 1A includes an xz-plane 114 and FIG. 1B includes an xy-plane 116 of the same Cartesian coordinate system having three orthogonal, spatial coordinate axes labeled x, y and z. The coordinate system specifies orientations and coordinate locations within the body of water. The x-direction specifies the position of a point in a direction parallel to the length of the streamers or in the direction the survey vessel is traveling and is referred to as the "in-line" direction. The y-direction specifies the position of a point in a direction perpendicular to the x-axis and approximately parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices may be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 has a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 may be activated to produce acoustic signals at spatial and/or temporal intervals. Activation the source 104 is often called a "shot." In other implementations, the source 104 may be towed by one survey vessel and the streamers may be towed by a different survey vessel. FIG. 1A shows an acoustic signal expanding outward from the source 104 as a pressure wavefield 136 represented by semicircles of increasing radius centered at the source 104. The outwardly expanding wavefronts from the source 104 may be spherical but are shown in vertical plane cross section in FIG. 1A. The outward and downward expanding portion of the pressure wavefield 136 and any portion of the pressure wavefield 136 reflected from the free-surface 112 are called the "source signal." The source signal eventually reaches the formation surface 122 of the subterranean formation 120, at which point the source signal may be partially reflected from the formation surface 122 and partially refracted downward into the subterranean formation 120, becoming elastic waves within the subterranean formation 120. In other words, in the body of water, the acoustic signal is primarily comprised of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, waves of significant amplitude may be generally reflected from points on or close to the formation surface 122, such as point 138, and from points on or very close to interfaces in the subterranean formation 120, such as points 140 and 142. The upward expanding waves emanating from the subterranean formation 120 are collectively the "reflected wavefield."

The waves that comprise the reflected wavefield may be generally reflected at different times within a range of times following the initial source signal. A point on the formation surface 122, such as the point 138, may receive a pressure disturbance from the source signal more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which waves are reflected from various points within the subterranean formation 120 may be related to the distance, in three-dimensional space, of the points from the activated source 104.

Acoustic and elastic waves, however, may travel at different velocities within different materials as well as within the same material under different pressures. Therefore, the travel times of the source signal and reflected wavefield may be functions of distance from the source 104 as well as the materials and physical characteristics of the materials through which the wavefields travel. In addition, expanding wavefronts of the wavefields may be altered as the wavefronts cross interfaces and as the velocity of sound varies in the media traversed by the wavefronts. The superposition of waves reflected from within the subterranean formation 120 in response to the source signal may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

FIG. 2 shows a side-elevation view of the seismic data acquisition system with a magnified view 202 of the receiver 118. In this example, the magnified view 202 reveals that the receiver 118 is a multi-component sensor that comprises a pressure sensor 204 and a particle motion sensor 206. The pressure sensor may be, for example, a hydrophone. Each pressure sensor is a non-directional sensor that measures changes in hydrostatic pressure over time to produce pressure data denoted by $p(\vec{x}_S, \vec{x}_R, t)$, where $\vec{x}_S$ represents source 104 coordinates $(x_S, y_S, z_S)$, $\vec{x}_R$ represents receiver 118 coordinates $(x_R, y_R, z_R)$, and t represents time. The particle motion sensors may be responsive to water motion. The term "particle motion sensor" is a general term that refers to a sensor configured to detect particle displacement, particle velocity, or particle acceleration over time. In general, particle motion sensors detect particle motion in a particular direction and may be responsive to such directional displacement of the particles, velocity of the particles, or acceleration of the particles. A particle motion sensor that measures particle displacement generates particle displacement data denoted by $g_{\vec{n}}(\vec{x}_S, \vec{x}_R, t)$, where the vector $\vec{n}$ represents the direction along which particle displacement is measured. A particle motion sensor that measures particle velocity (i.e., particle velocity sensor) generates particle velocity data denoted by $v_{\vec{n}}(\vec{x}_S, \vec{x}_R, t)$. A particle motion sensor that measures particle acceleration (i.e., accelerometer) generates particle acceleration data denoted by $a_{\vec{n}}(\vec{x}_S, \vec{x}_R, t)$. The data generated by one type of particle motion sensor may be converted to another type. For example, particle displacement data may be differentiated to obtain particle velocity data, and particle acceleration data may be integrated to obtain particle velocity data.

The term "particle motion data" is a general term that refers to particle displacement data, particle velocity data, or particle acceleration data, and the term "seismic data" refers to pressure data and/or particle motion data. The pressure data represents a pressure wavefield, particle displacement data represents a particle displacement wavefield, particle velocity data represents a particle velocity wavefield, and particle acceleration data represents particle acceleration wavefield. The particle displacement, velocity, and acceleration wavefields are referred to as particle motion wavefields.

The particle motion sensors are typically oriented so that the particle motion is measured in the vertical direction (i.e., $\vec{n}=(0,0,z)$) in which case $g_z(\vec{x}_S, \vec{x}_R, t)$ is called vertical displacement data, $v_z(\vec{x}_S, \vec{x}_R, t)$ is called vertical velocity data, and $a_z(\vec{x}_S, \vec{x}_R, t)$ is called vertical acceleration data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_S, \vec{x}_R, t)$, each receiver may include a particle motion sensor that measures the wavefield in the in-line direction in order to obtain the inline velocity data, $v_x(\vec{x}_S, \vec{x}_R, t)$, and a particle motion sensor that measures the wavefield in the cross-line direction in order to obtain the cross-line velocity data, $v_y(\vec{x}_S, \vec{x}_R, t)$. In certain implementations, the receivers may comprise only pressure sensors, and in other implementations, the receivers may comprise only particle motion sensors.

The streamers 106-111 and the survey vessel 102 may include sensing electronics and data-processing facilities that allow seismic data generated by each receiver to be correlated with the time when the source 104 is activated, absolute positions on the free surface 112, and absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored electronically or magnetically on data-storage devices located onboard the survey vessel 102 and/or transmitted onshore to a seismic data-processing facility.

Each pressure sensor and particle motion sensor may include an analog-to-digital converter that converts time-dependent analog signals into discrete time series data that consist of a number of consecutively measured values called "amplitudes" separated in time by a sample rate. The pressure or particle motion data generated by a pressure sensor or a particle motion sensor is time series data and is called a "trace," which may consist of thousands of samples collected at a typical sample rate of about 1 to 5 ms. A trace is a recording of a subterranean formation response to acoustic energy that passes from an activated source, into the subterranean formation where a portion of the acoustic energy is reflected and/or refracted, and ultimately detected by a sensor as described above. A trace records variations in a time-dependent amplitude that corresponds to fluctuations in acoustic energy of the wavefield measured by the sensor. In general, each trace is an ordered set of discrete spatial and time-dependent pressure or motion sensor amplitudes denoted by:

$$tr(\vec{x}_S, \vec{x}_R, t) = \{A(\vec{x}_S, \vec{x}_R, t_j)\}_{j=0}^{J-1} \qquad (1)$$

where tr represents pressure, particle displacement, particle velocity, or particle acceleration;

A is amplitude;

$t_j$ is the j-th sample time; and

J is the number of time samples in the trace.

The coordinate location $\vec{x}_R$ of each receiver may be calculated from global position information obtained from one or more global positioning devices located along the streamers, survey vessel, and buoys and the known geometry and arrangement of the streamers and receivers. The coordinate location $\vec{x}_S$ of the source 104 may also be obtained from one or more global positioning devices located at the source 104. Each trace may also include a trace header not represented in Equation (1) that identifies the specific receiver that generated the trace, receiver and source GPS spatial coordinate locations, and may include time sample rate and the number of time samples.

Different portions of a reflected wavefield that emanates from the subterranean formation may undergo different reflection events before being measured by the receivers. For example, a portion of the reflected wavefield may travel directly from the subterranean formation to the receivers. However, because the free surface acts as a nearly perfect reflector other portions of the reflected wavefield may be reflected a number of times between the free surface and the subterranean formation before being measured by the receivers. The reflected wavefield may have also been reflected a number of times between different interfaces within the subterranean formation before entering the body of water.

Figure 3A:
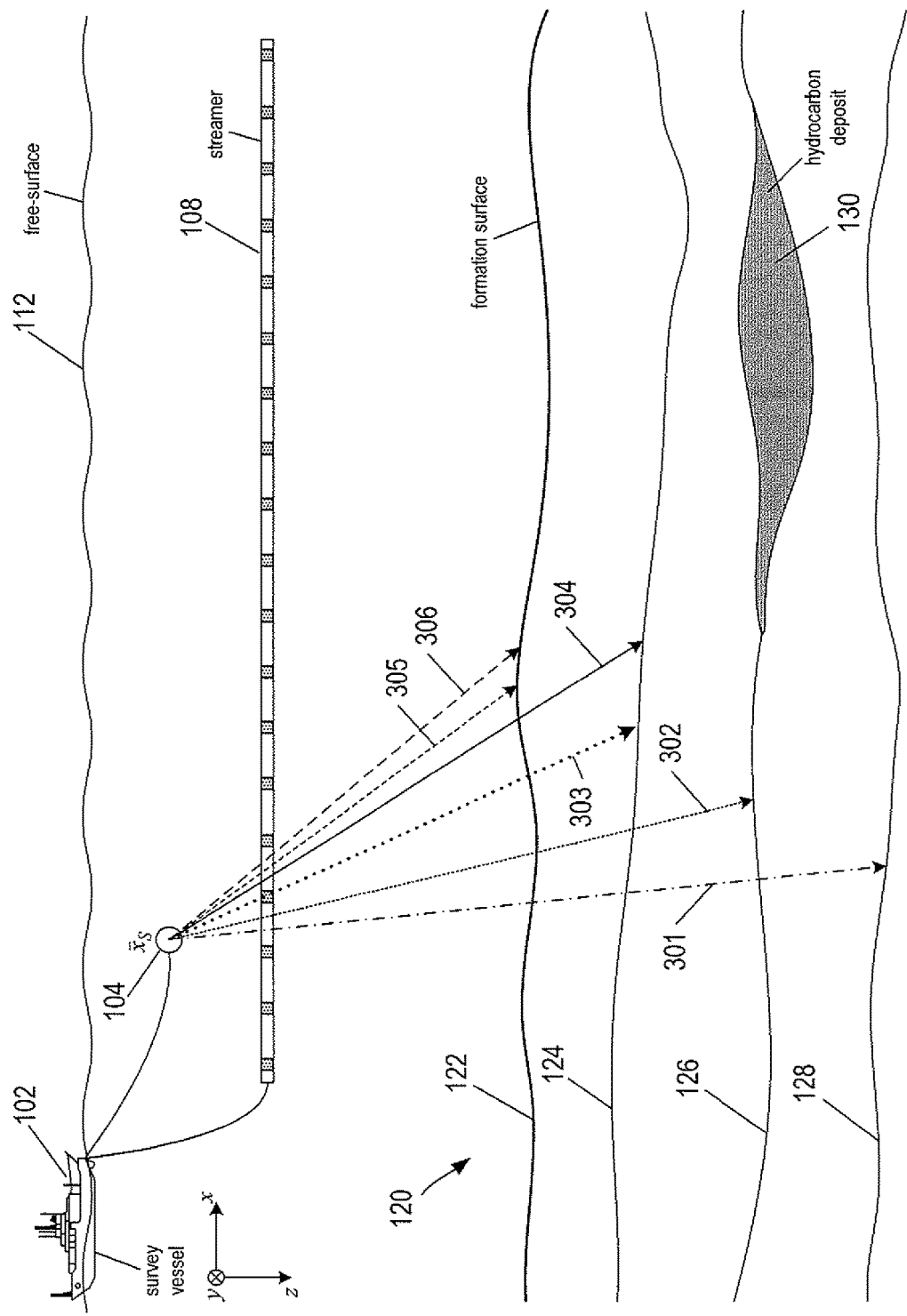
FIGS. 3A-3C show a number of ways acoustic energy in a reflected wavefield reverberates between the free surface and the subterranean formation.
Figure 3B:
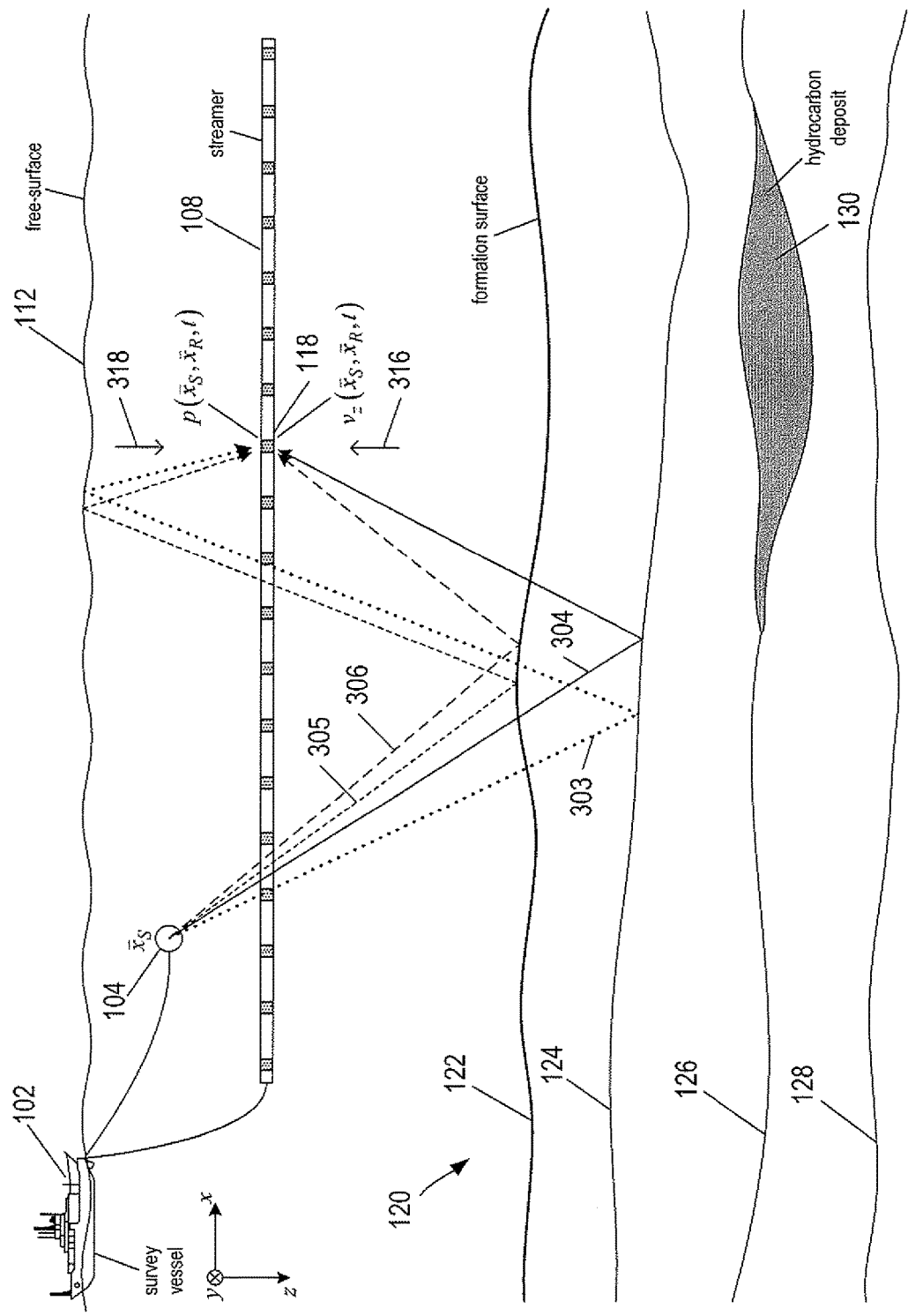
Figure 3C:
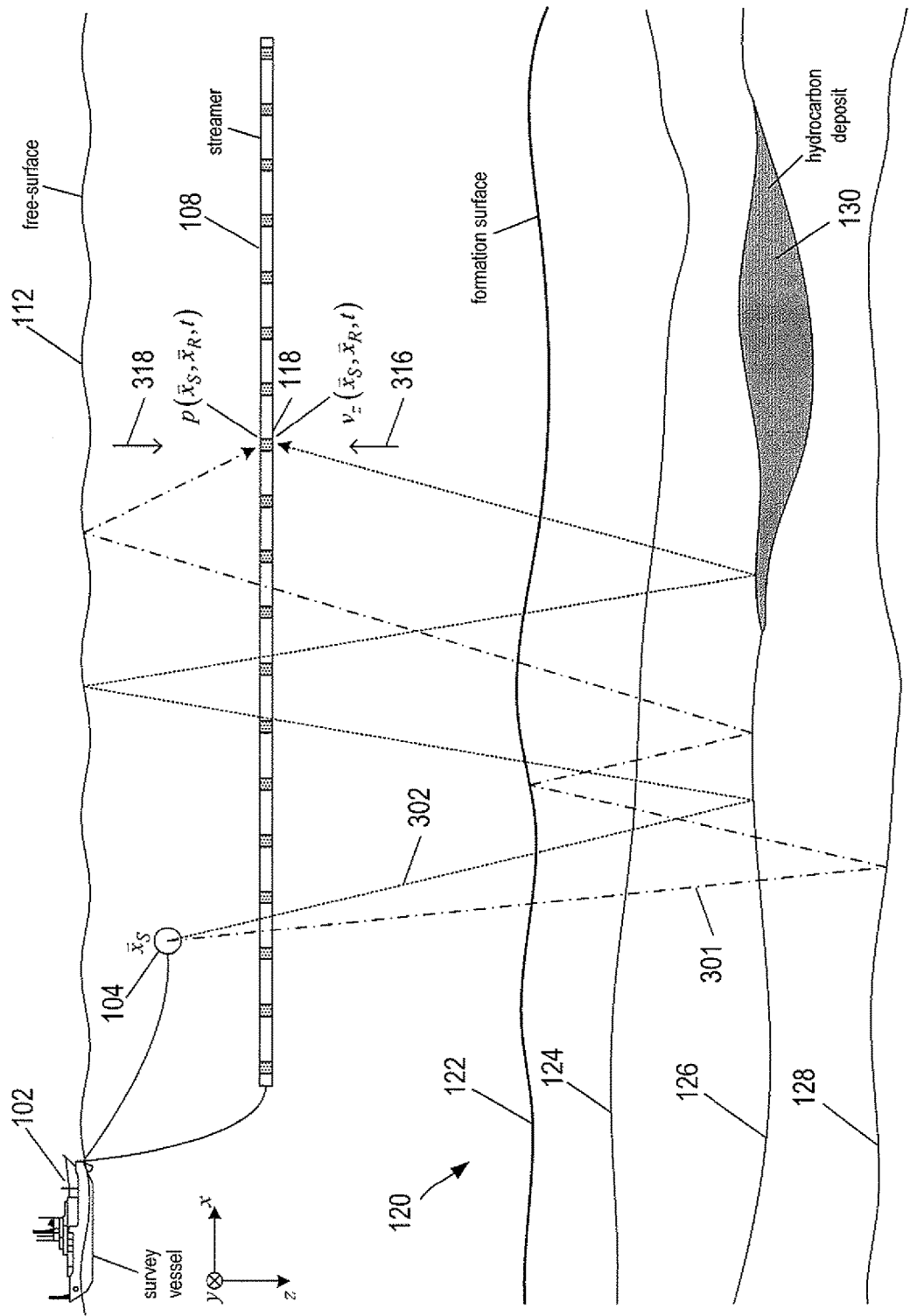

FIGS. 3A-3C show a number of ways acoustic energy reverberates between the free surface and the subterranean formation before being measured at the receiver 118. In FIG. 3A, directional arrows 301-306 represent ray paths of different portions of the source signal generated by the source 104 that reach different interfaces within the subterranean formation 102 before being reflected. For example, ray path 301 represents a portion of the acoustic energy in the source signal that reaches the interface 128 and ray path 306 represents a portion of the acoustic energy in the source signal that reaches the formation surface 122. In FIG. 3B, ray paths 304 and 306 represent reflections from the interface 124 and the formation surface 122 that travel directly to the receiver 118, which are called "up-going primary reflections" as indicated by directional arrow 316. Ray paths 303 and 305 represent reflections from the interface 124 and the formation surface 122 followed by reflections from the free surface 112 before traveling directly to the receiver 118, which are called "down-going primary reflections" as indicated by directional arrow 318. In FIG. 3C, ray paths 301 and 302 represent multiple reflections between interfaces within the subterranean formation 120 and the free surface 112. Ray path 301 represent a down-going multiple as represented by directional arrow 318. Ray path 302 represents an up-going multiple as represented by directional arrow 316.

Each trace records the primaries and various types of multiples. For example, pressure data $p(\vec{x}_S, \vec{x}_R, t)$ generated at the receiver 118 records the primary and multiple reflections, and vertical velocity data $v_z(\vec{x}_S, \vec{x}_R, t)$ also generated at the receiver 118 records the primary and multiple reflections. The pressure data $p(\vec{x}_S, \vec{x}_R, t)$ and the vertical velocity data $v_z(\vec{x}_S, \vec{x}_R, t)$ comprise both up-going and down-going pressure and vertical velocity wavefields, respectively, that reach the receiver 118.

FIG. 4 shows a set of pressure data 400 collected for a number of different source and receiver coordinate locations and a set of vertical velocity data 402 collected for the same source and receiver coordinate locations. Axis 404 represents source coordinates, axis 406 represents receiver coordinates, and axis 408 represents time. Wiggle lines represent traces of pressure and vertical velocity data generated by collocated pressure and vertical velocity sensors and different locations for each source activation. For example, a wiggle line 410 represents a trace of pressure data $p(\vec{x}_S, \vec{x}_R, t)$, as described above with reference to Equation (1), recorded for a source activated at a source location $\vec{x}_S$ and a pressure sensor at a receiver location $\vec{x}_R$. A wiggle line 412 represents a trace of vertical velocity data $v_z(\vec{x}_S, \vec{x}_R, t)$, as described above with reference to Equation (1), recorded for the same source and receiver coordinate locations. The traces of pressure data form the set of pressure data 400 represented by:

$$\vec{p} = \{p(\vec{x}_S, \vec{x}_R, t)\} \qquad (2a)$$

and the traces of vertical velocity data form the set of vertical velocity data 402 represented by:

$$\vec{v}_z = \{v_z(\vec{x}_S, \vec{x}_R, t)\} \qquad (2b)$$

The traces in the sets of pressure and vertical velocity data 400 and 402 may be sorted into different domains, such as the common-shot domain, common-receiver-station domain, common-channel domain, and common-midpoint domain.

The sets of pressure data and vertical velocity data may be transformed from the space-time ("s-t") domain to the wavenumber-frequency ("w-f") domain using a fast Fourier transform ("FFT") or a discrete Fourier transform ("DFT") as follows:

$$p(\vec{x}_S, \vec{x}_R, t) \rightarrow P(\vec{k}_R, z_R | \vec{x}_S, \omega) \qquad (3a)$$

$$v_z(\vec{x}_S, \vec{x}_R, t) \rightarrow V_z(\vec{k}_R, z_R | \vec{x}_S, \omega) \qquad (3b)$$

where $\vec{k}_R = (k_{Rx}, k_{Ry})$ is a horizontal wavevector with in-line wavenumber $k_{Rx}$ and cross-line wavenumber $k_{Ry}$;

$\omega$ is the angular frequency (i.e., $\omega = 2\pi f$);

P is pressure data in the w-f domain; and $V_Z$ is vertical velocity data in the w-f domain.

The pressure and vertical velocity data are extrapolated to the free surface. Extrapolation of the pressure data $P(\vec{k}_R, z_R | \vec{x}_S, \omega)$ from the depth of the pressure sensor 506 to the free surface 112 is represented by:

$$P(\vec{k}_R, z_R = 0 | \vec{x}_S, \omega) = P(\vec{k}_R, z_R | \vec{x}_S, \omega) e^{-ik_{Rz} z_R} \qquad (4a)$$

Extrapolation of the vertical velocity data $V_z(\vec{k}_R, z_R|\vec{x}_S, \omega)$ from the depth of the pressure sensor 506 to the free surface 112 is represented by:

$$V_z(\vec{k}_R, z_R=0|\vec{x}_S,\omega) = V_z(\vec{k}_R, z_R|\vec{x}_S,\omega) e^{-ik_{Rz}z_R} \quad (4b)$$

where $$k_{Rz} = \sqrt{\left(\frac{\omega}{c}\right)^2 - k_{Rx}^2 - k_{Ry}^2}$$

is the vertical wavenumber; and
c is the speed of sound in water.

Figure 5:
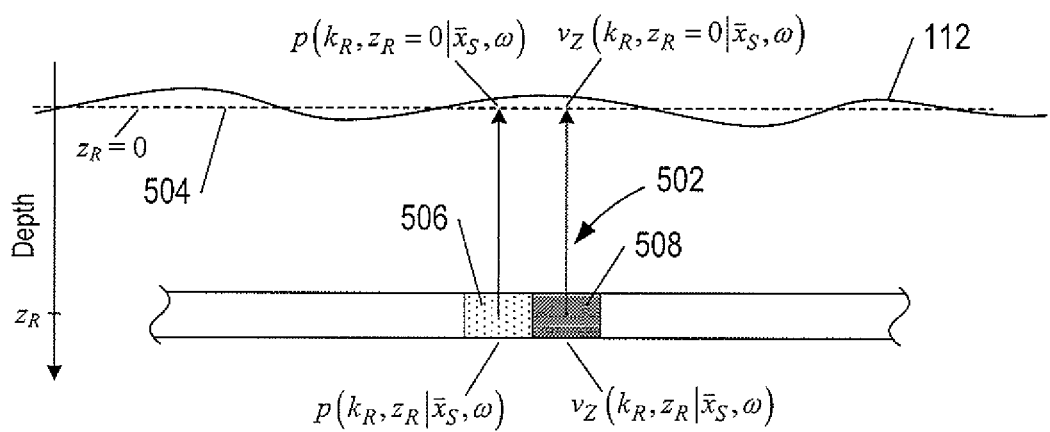
FIG. 5 shows an example of extrapolating pressure data and vertical velocity data from a receiver coordinate to the free surface.

FIG. 5 shows an example of extrapolating pressure and vertical velocity data generated by collocated pressure and particle motion sensors of a receiver 502 to the free surface 112. Dashed line 504 represents the level of the free surface, which corresponds to a depth of $z_R=0$. The receiver 502 with collocated pressure sensor 506 and particle motion sensor 508 is located at a depth $z_R$ below the free surface 112. Note that in the following description, unless otherwise stated, the depth coordinate $z_R$ is equal to zero.

Figure 6:
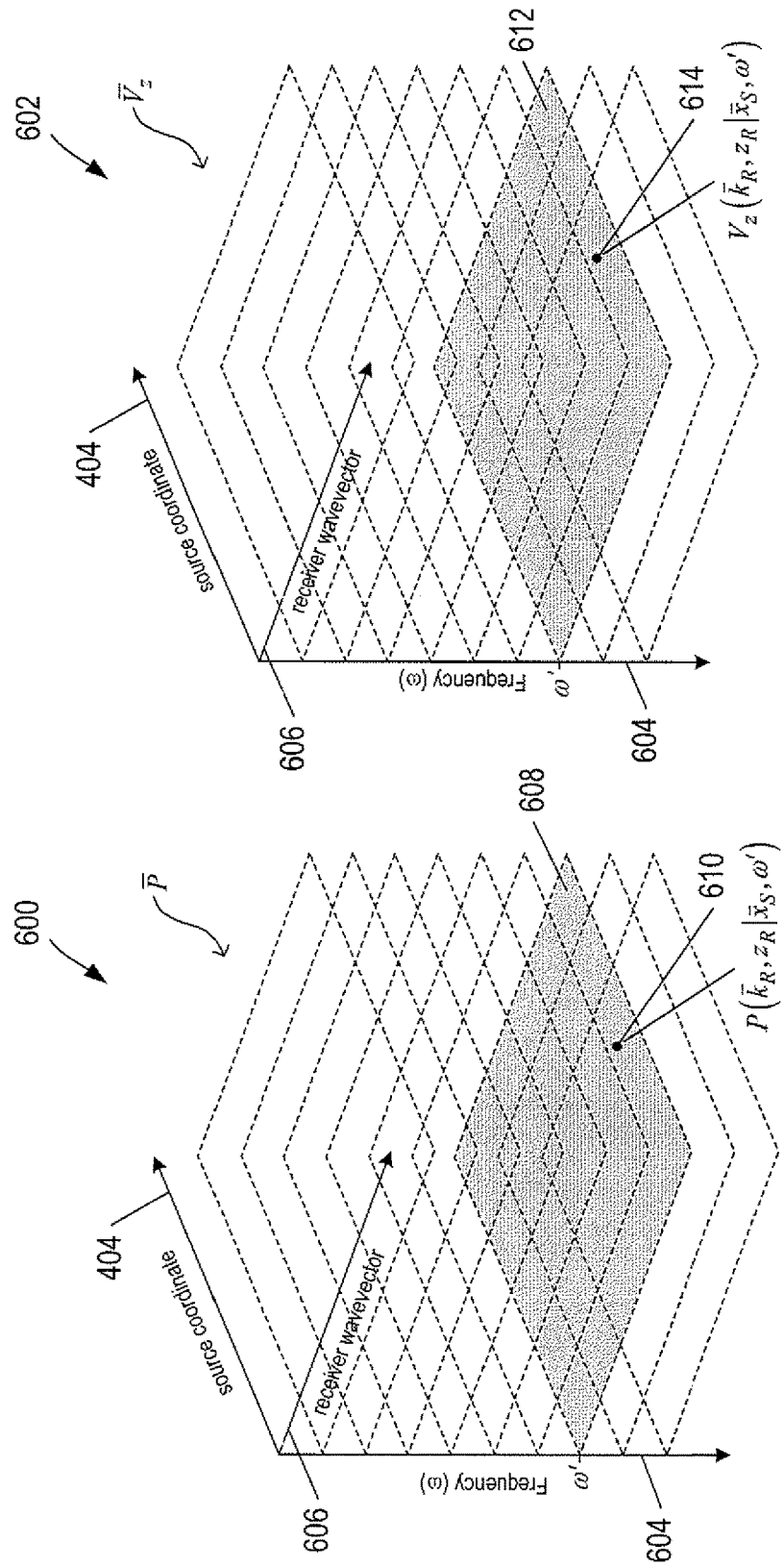
FIG. 6 shows a set of pressure data and a set of vertical velocity data in a wavenumber-frequency domain.

FIG. 6 shows a set of pressure data 600 in the w-f domain and a set of vertical velocity data 602 in the w-f domain. Axis 604 represents a range of angular frequencies denoted by $\omega$. Axis 606 represent receiver wavevector coordinates ($\vec{k}_R, z_R$). Layers in the set of pressure data 600 represent matrices, or frequency slices, of pressure data that have the same angular frequency. Layers in the set of vertical velocity data 602 represent matrices, or frequency slices, of vertical velocity data that have the same angular frequency. For example, shaded layer 608 represents a matrix or frequency slice of pressure data over the range of source and receiver wavevector coordinates at angular frequency $\omega'$, and shaded layer 612 represents a matrix or frequency slice of vertical velocity data over the range of source and receiver wavevector coordinates at the same angular frequency $\omega'$. Points 610 and 614 represent pressure and vertical velocity amplitudes with the same source and receiver wavevector coordinates and the same angular frequency denoted by ($\vec{k}_R, z_R|\vec{x}_S, \omega'$). The set of pressure data 600 in the w-f domain is represented by:

$$\bar{P} = \{P(\vec{k}_R, z_R|\vec{x}_S, \omega)\} \quad (5a)$$

and the set of vertical velocity data 602 in the w-f domain is represented by:

$$\bar{V}_z = \{V_z(\vec{k}_R, z_R|\vec{x}_S, \omega)\} \quad (5b)$$

Wavefield separation may be used to decompose the set of pressure data into a set of up-going pressure data and a set of down-going pressure data. The down-going pressure data is calculated as follows:

$$P^d(\vec{k}_R, z_R|\vec{x}_S, \omega) = \frac{1}{2}\left[P(\vec{k}_R, z_R|\vec{x}_S, \omega) + \frac{\rho\omega}{k_{Rz}} V_z(\vec{k}_R, z_R|\vec{x}_S, \omega)\right] \quad (6a)$$

and the up-going pressure data is calculated as follows:

$$P^u(\vec{k}_R, z_R|\vec{x}_S, \omega) = \frac{1}{2}\left[P(\vec{k}_R, z_R|\vec{x}_S, \omega) + \frac{\rho\omega}{k_{Rz}} V_z(\vec{k}_R, z_R|\vec{x}_S, \omega)\right] \quad (6b)$$

where $\rho$ is the density of water.

Figure 7:
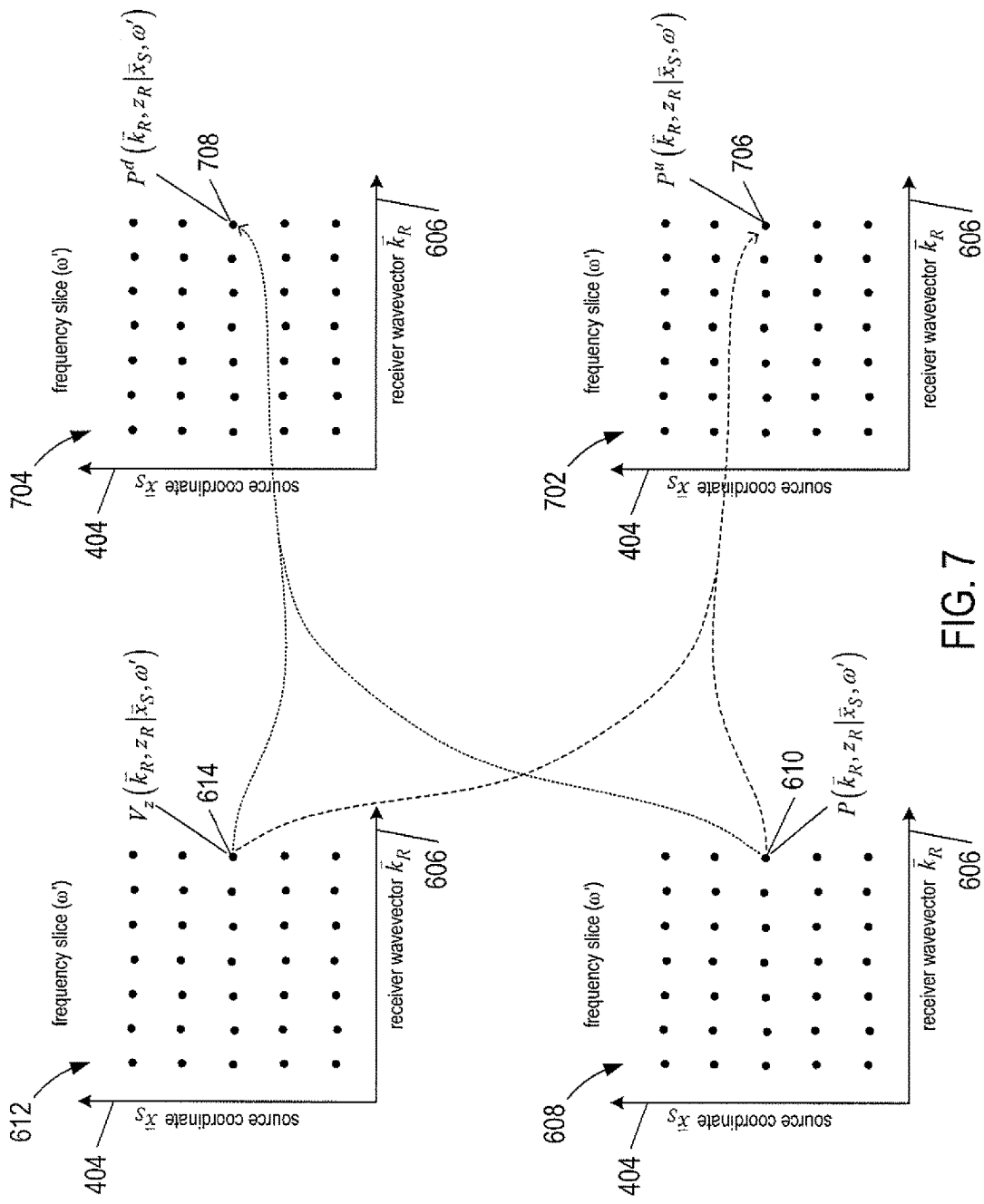
FIG. 7 shows a plot of frequency slices of pressure data and vertical velocity data in the wavenumber-frequency domain.

FIG. 7 shows a plot of the frequency slice 608 of pressure data and a plot of the frequency slice 612 of vertical velocity data described above with reference to FIG. 6. Points in plots 608 and 612 represent corresponding pressure and vertical velocity amplitudes at the same angular frequency $\omega'$ and the same source coordinates and receiver wavevector coordinates. For example, point 610 represents pressure data $P(\vec{k}_R, z_R|\vec{x}_S, \omega')$ and point 614 represents vertical velocity data $V_z(\vec{k}_R, z_R|\vec{x}_S, \omega')$ at the same angular frequency $\omega'$ and with the same source coordinates and receiver wavenumber coordinates. FIG. 7 also shows plots of frequency slices of up-going pressure data 702 and down-going pressure data 704 for the same angular frequency $\omega'$ and source coordinates and receiver wavenumber coordinates. For example, point 706 represents the up-going pressure data $P^u(\vec{k}_R, z_R|\vec{x}_S, \omega')$ calculated from the pressure data $P(\vec{k}_R, z_R|\vec{x}_S, \omega')$ at the point 610 and vertical velocity data $V_z(\vec{k}_R, z_R|\vec{x}_S, \omega')$ at the location 614, as described above with reference to Equation (6b). Point 708 represents the down-going pressure data $P^d(\vec{k}_R, z_R|\vec{x}_S, \omega')$ calculated from the pressure data $P(\vec{k}_R, z_R|\vec{x}_S, \omega')$ at point 610 and vertical velocity data $V_z(\vec{k}_R, z_R|\vec{x}_S, \omega')$ at the location 614, as described above with reference to Equation (6a).

FIG. 8 shows a set of up-going pressure data 800 and a set of down-going pressure data 802 in the w-f domain. Layers in the set of pressure data 802 represent matrices or frequency slices of up-going pressure data with the same angular frequency, and layers in the set of down-going data 802 represent matrices or frequency slices of down-going pressure data with the same angular frequency. For example, shaded layers 804 and 806 represent frequency slice 702 of up-going pressure data and frequency slice 704 of down-going pressure data, respectively, in FIG. 7. The set of up-going pressure data 800 in the w-f domain is represented by:

$$\bar{P}^u = \{P^u(\vec{k}_R, z_R|\vec{x}_S, \omega)\} \quad (7a)$$

and the set of down-going pressure data 802 in the w-f domain is represented by:

$$\bar{P}^d = \{P^d(\vec{k}_R, z_R|\vec{x}_S, \omega)\} \quad (7b)$$

The set of up-going pressure data $\bar{P}^u$ and the set of down-going pressure data $\bar{P}^d$ data may be inverse transformed from the w-f domain to the s-t domain using a fast inverse Fourier transform ("IFFT") or an inverse discrete Fourier transform ("IDFT") as follows:

$$P^u(\vec{k}_R, z_R|\vec{x}_S, \omega) \rightarrow p^u(\vec{x}_S, \vec{x}_R, t) \quad (8a)$$

$$P^d(\vec{k}_R, z_R|\vec{x}_S, \omega) \rightarrow p^d(\vec{x}_S, \vec{x}_R, t) \quad (8b)$$

FIG. 9 shows a set of up-going going pressure data 900 and a set of down-going pressure data 902 in the s-t domain. Wiggle lines represent traces of up-going and down-going components of the pressure data 400. For example, wiggle line 904 represents a trace of up-going pressure data $p^u(\vec{x}_S, \vec{x}_R, t)$ and wiggle line 906 represents a trace of down-going pressure data $p^d(\vec{x}_S, \vec{x}_R, t)$. The trace 904 of up-going pressure data $p^u(\vec{x}_S, \vec{x}_R, t)$ represents the up-going pressure wavefield portion of the trace 410 of the pressure data $p(\vec{x}_S, \vec{x}_R, t)$ in FIG. 4. The trace 905 of down-going pressure data $p^d(\vec{x}_S, \vec{x}_R, t)$ represents the down-going pressure wavefield portion of the trace 412 of the pressure data $p(\vec{x}_S, \vec{x}_R, t)$ in FIG. 4. In other words, the up-going pressure data $p^u(\vec{x}_S, \vec{x}_R, t)$ represents the portion of the reflected wavefield recorded in the pressure data $p(\vec{x}_S, \vec{x}_R, t)$ that travels upward to the receiver 118 as represented by directional arrow 316 in FIG. 3. The down-going pressure data $p^d(\vec{x}_S, \vec{x}_R, t)$ represents the down-going pressure wavefield portion of the trace of pressure data $p(\vec{x}_S, \vec{x}_R, t)$ that travels downward to the receiver 118 as represented by directional arrow 318 of FIG. 3. The traces of up-going pressure data form a set of up-going pressure data 900 represented by:

$$\vec{p}^u = \{P^u(\vec{x}_S, \vec{x}_R, t)\} \quad (9a)$$

and the traces of down-going pressure data form a set of down-going pressure data 902 represented by:

$$\vec{p}^d = \{P^d(\vec{x}_S, \vec{x}_R, t)\} \quad (9b)$$

Both the up-going and down-going pressure data record primary and multiple reflections.

Because the in-line and cross-line receiver coordinates record the actual locations of receivers in real world conditions, the in-line and cross-line receiver coordinates are not regularly spaced apart, and therefore do not conform to regularly spaced grid points of a migration grid. The in-line and cross-line receiver coordinates of the set of up-going pressure data 900 and the set of down-going pressure data 902 are regularized to match the regularly spaced grid points of a migration grid. The in-line and cross-line coordinates of the receivers of the up-going and down-going pressure data may be regularized by moving the in-line and cross-line coordinates to the closest regularly spaced grid points of the migration grid. In other words, for each receiver coordinate $\vec{x}_R$, $$P^u(\vec{x}_S, \vec{x}_R, \omega) \rightarrow P^u(\vec{x}_S, x'_R, y'_R, z_R=0, \omega) = P^u(\vec{x}_S, \vec{x}'_R, \omega) \quad (10a)$$

$$P^d(\vec{x}_S, \vec{x}_R, \omega) \rightarrow P^d(\vec{x}_S, x'_R, y'_R, z_R=0, \omega) = P^d(\vec{x}_S, \vec{x}'_R, \omega) \quad (10b)$$

where $x'_R$ and $y'_R$ are the in-line and cross-line regularized receiver coordinates.

Figure 10A:
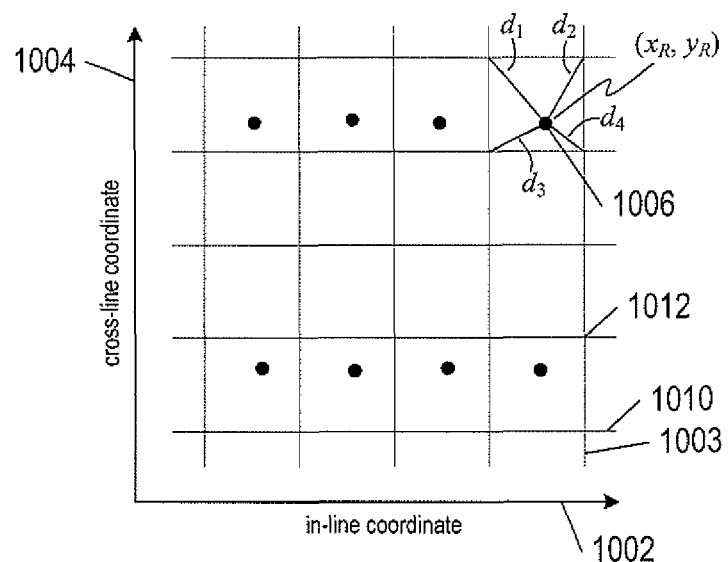
FIGS. 10A-10B shows an example of regularizing irregularly spaced receiver coordinates to regularly spaced grid points of a migration grid.
Figure 10B:
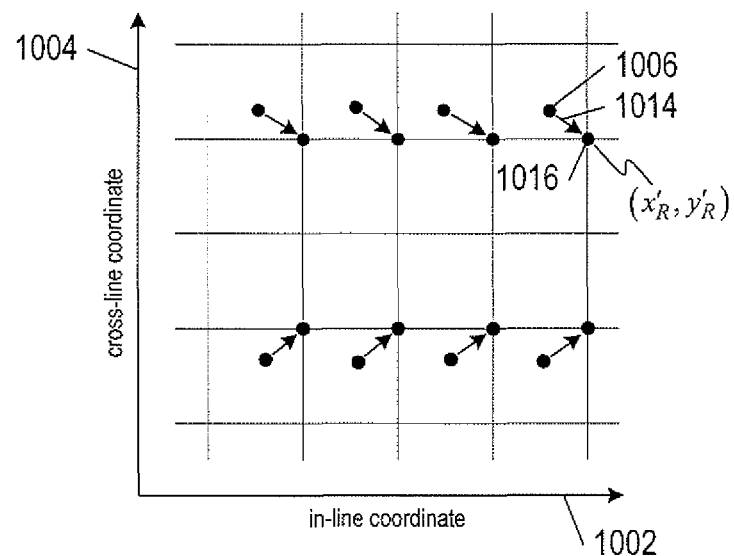

Regularization may be used to move irregularly spaced receiver coordinates to a set of regularly spaced grid points of a migration grid. FIGS. 10A-10B show an example of regularization of irregularly spaced receiver coordinates to regularly spaced grid points of a migration grid. FIG. 10A shows an example of irregularly spaced receiver coordinates and an overlay of regularly spaced grid lines of a migration grid. Axis 1002 represents in-inline receiver coordinate $x_R$. Axis 1004 represents cross-line receiver coordinate $y_R$. Points represent in-line and cross-line receiver coordinates of the eight receivers of a seismic data acquisition system. For example, point 1006 represents in-line and cross-line receiver coordinates $(x_R, y_R)$ of a receiver. Note that the in-line and cross-line receiver coordinates of the receivers are irregularly spaced apart, which may be due to currents, waves, and changing conditions of the body of water. Vertical and horizontal lines, such as vertical line 1008 and horizontal line 1010, represent regularly spaced grid lines (i.e., in-line and cross-line) of a migration grid. Intersections between vertical and horizontal grid lines, such as intersection 1012, represent regularly spaced grid points (i.e., regularly spaced in-line and cross-line coordinates) of the migration grid. For each receiver coordinate, distances from the receiver coordinate to the four nearest grid points are determined. For example, in FIG. 10A, $d_1$, $d_2$, $d_3$, and $d_4$ represent distances from the point 1006 to the four nearest grid points of the migration grid. The irregularly spaced receiver coordinates may be regularized to nearest grid points as shown in FIG. 10B. Directional arrows represent regularizing the irregularly spaced receiver coordinates to nearest grid points of the migration grid. For example, directional arrow 1014 represents regularizing the receiver coordinate 1006 to a grid point 1016 of the migration grid. The regularly spaced receiver coordinates at grid points of the migration grid are denoted by $(x'_R, y'_R)$ and called "receiver migration grid coordinates."

In a typical marine survey, the receivers located along the streamers are spaced apart by about 12 meters to about 13 meters along the streamers in the in-line direction while adjacent streamers may be separated by anywhere from about 75 meters to about 100 meters or more. As a result, reflected wavefields sampled by the receivers may be spatially aliased in the cross-line direction. In addition, certain recorded traces may be corrupted or omitted because of problems with pressure and/or particle motion sensors. Interpolation may be used to fill in missing traces of up-going and down-going pressure data in the cross-line direction and replace any corrupted or missing traces of up-going and down-going pressure data in the in-line direction.

Figure 11A:
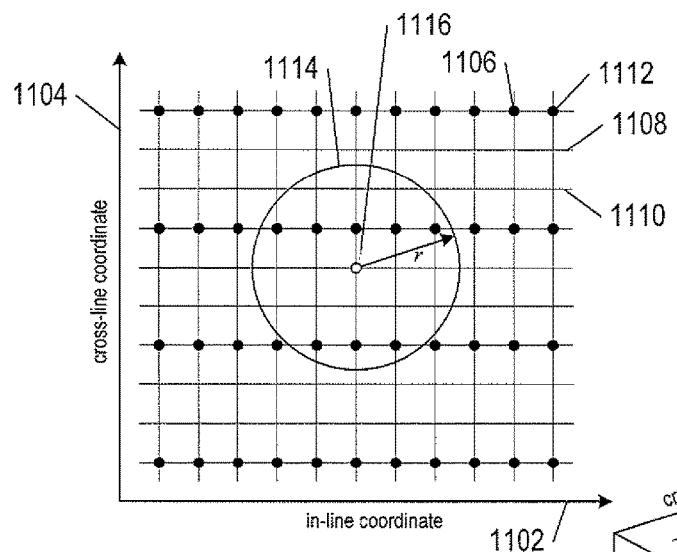
FIGS. 11A-11C show interpolation of traces of up-going and down-going pressure data at grid points of a migration grid.
Figure 11B:
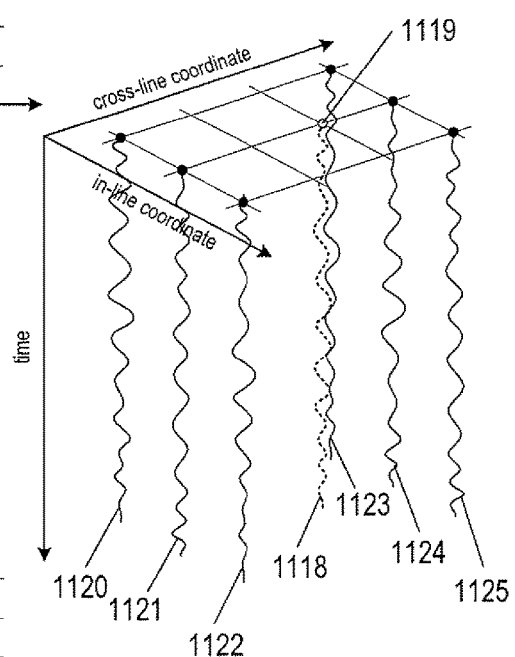
Figure 11C:
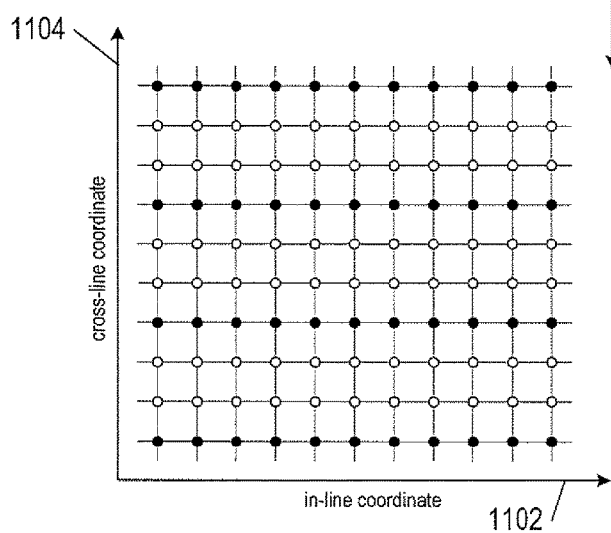

FIGS. 11A-11C show interpolation of traces of up-going and down-going pressure data at grid points of a migration grid. FIG. 11A shows a plot of regularized receiver coordinates at grid points of a migration grid. Axis 1102 represents in-line receiver coordinate $x_R$. Axis 1104 represents cross-line receiver coordinate $y_R$. Vertical and horizontal lines, such as vertical line 1106 and horizontal line 1108, represent regularly spaced grid lines of the migration grid. Intersections between vertical and horizontal grid lines, such as intersection 1110, represent regularly spaced grid points of the migration grid. Points, such as point 1112, located at grid points represent regularized receiver coordinates of up-going and down-going pressure data. Interpolation may be used to fill in traces of up-going and down-going pressure data at grid points from nearest traces of up-going and down-going pressure data at regularized receiver coordinates. For example, in FIG. 11A, the traces of up-going pressure data (and down-going pressure data) at regularized receiver coordinates that lie within a circle 1114 of radius r and centered at grid point 1116 may be used to interpolate a trace of up-going pressure data (and down-going pressure data) at the grid point 1116. The traces located closer to the grid point 1116 may be given more weight than traces located farther away from the grid point. In FIG. 11B, dotted wiggle line 1118 represents an interpolated trace of up-going pressure data (down-going pressure data) at a grid point 1119. In this example, the interpolated trace 1118 of up-going pressure data (down-going pressure data) is calculated from six nearest traces 1120-1125 of up-going pressure data (down-going pressure data). The traces 1123-1125 may be given more weight in the interpolation of the interpolated trace 1118 than the traces 1120-1122 because the regularized coordinates of the traces 1123-1125 are closer to the grid point 1119 than the regularized coordinates of the traces 1120-1122. Open circles at grid points in FIG. 11C represent regularly spaced receiver coordinates of interpolated traces of up-going and down-going pressure data. By interpolating traces in the cross-line direction, artifacts in seismic images due to spatial aliasing in the cross-line direction may be avoided.

Regularization and interpolation may be accomplished with an anti-leakage Fourier transform. Other regularization and interpolation techniques include linear moveout with bilinear interpolation, three-dimensional interpolation, and five-dimensional interpolation.

Figure 12A:
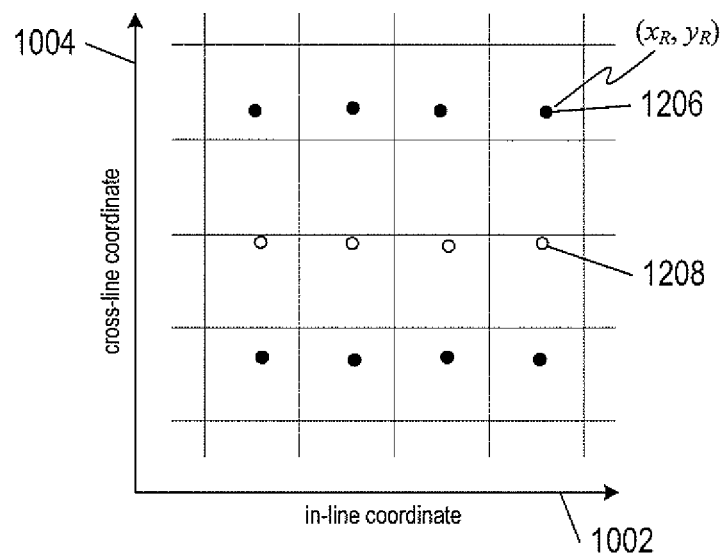
FIGS. 12A-12B show an example of interpolation followed by regularization of sets of up-going and down-going pressure data.
Figure 12B:
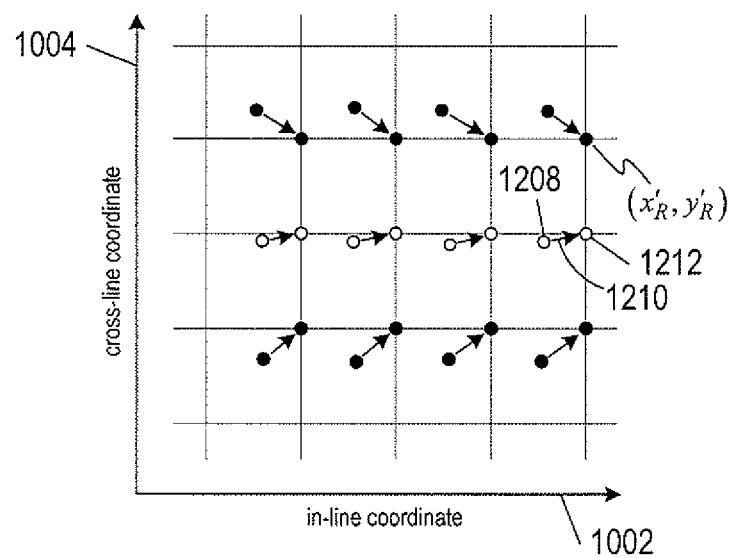

In other embodiments, interpolation may be applied first to interpolate up-going pressure data (down-going pressure data) from the irregularly spaced up-going pressure data (down-going pressure data) followed by regularization of the interpolated and known up-going pressure data (down-going pressure data). FIG. 12A shows points, such as point 1202, that represent irregularly spaced receiver coordinates of up-going pressure data (down-going pressure data). Open circles, such as open circle 1208, represent receiver coordinates of interpolated pressure data (down-going pressure data) from nearest known up-going pressure data (down-going pressure data), as described above with reference to FIG. 11B. The irregularly spaced receiver coordinates of up-going pressure data (down-going pressure data) may be regularized to nearest grid points as shown in FIG. 12B. Directional arrows represent regularizing the irregularly spaced receiver coordinates of up-going pressure data (down-going pressure data) to nearest grid points of the migration grid, as described above with reference to FIGS. 10A-10B. For example, directional arrow 1210 represents regularizing the receiver coordinate 1208 to a grid point 1212 of the migration grid.

Figure 13:
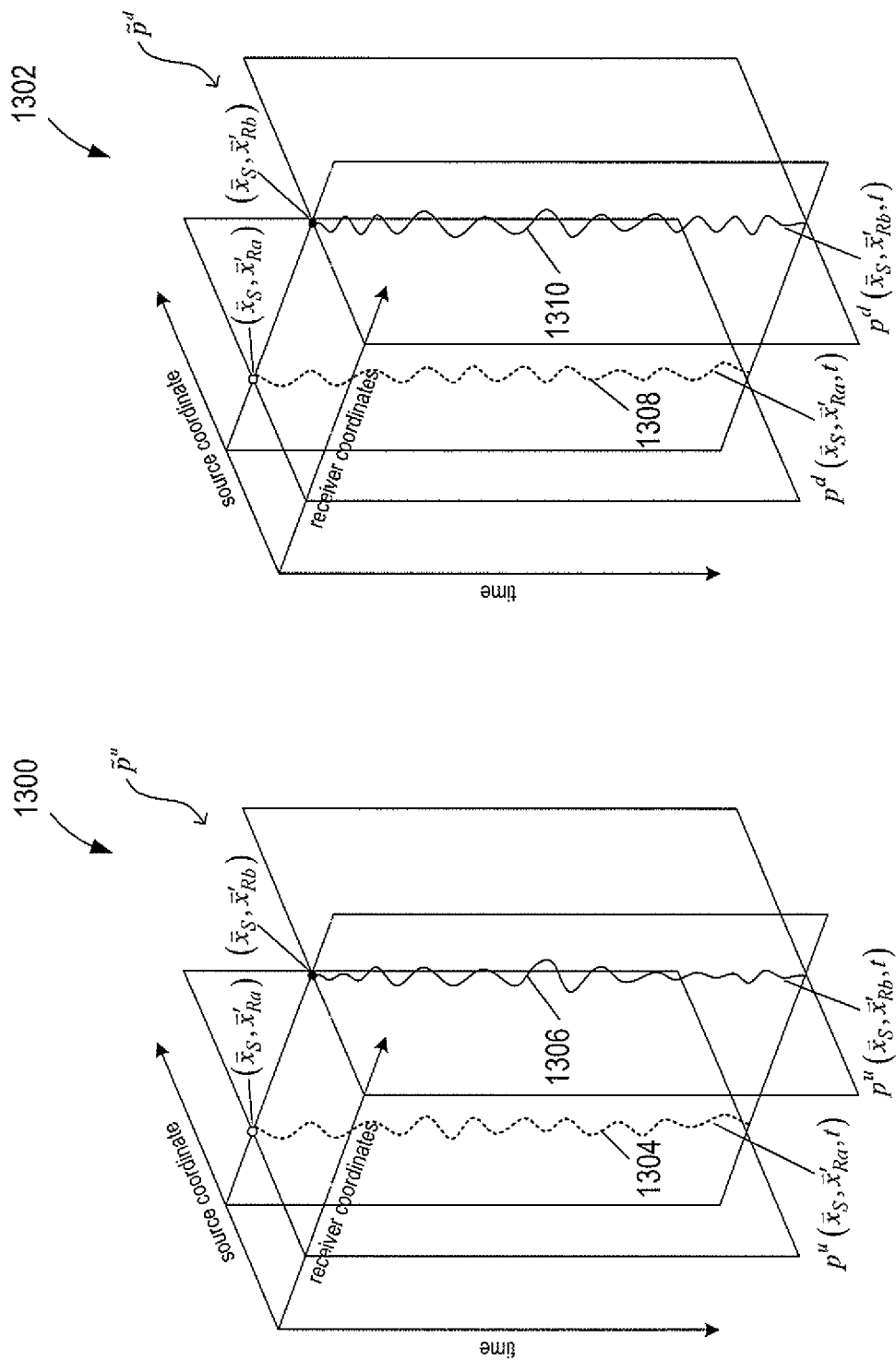
FIG. 13 shows a set of interpolated and regularized up-going going pressure data and a set of interpolated and regularized down-going pressure data in the space-time domain.

FIG. 13 shows a set of interpolated and regularized up-going pressure data 1300 and a set of interpolated and regularized down-going pressure data 1302 in the s-t domain. Dashed wiggle line 1304 represents an interpolated trace of up-going pressure data $p^u(\vec{x}_S, \vec{x}'_{Ra}, t)$, and wiggle line 1306 represents a regularized trace of up-going pressured data $p^u(\vec{x}_S, \vec{x}'_{Rb}, t)$. Dashed wiggle line 1308 represents an interpolated trace of down-going pressure data $p^d(\vec{x}_S, \vec{x}'_{Ra}, t)$, and wiggle line 1310 represents a regularized trace of down-going pressured data $p^d(\vec{x}_S, \vec{x}'_{Rb}, t)$. The traces of interpolated and regularized up-going pressure data form the set of up-going pressure data 1300 represented by:

$$\tilde{p}^u = \{p^u(\vec{x}_S, \vec{x}'_R, t)\} \tag{11a}$$

and the traces of interpolated and regularized down-going pressure data form the set of down-going pressure data 1302 represented by:

$$\tilde{p}^d = \{p^d(\vec{x}_S, \vec{x}'_R, t)\} \tag{11b}$$

The set of interpolated and regularized up-going pressure data 1200 and set of interpolated and regularized down-going pressure data 1202 are transformed from the s-t domain to the space-frequency ("s-f") domain using an FFT or a DFT as follows:

$$p^u(\vec{x}_S, \vec{x}'_R, t) \rightarrow p^u(\vec{x}_S, \vec{x}'_R, \omega) \tag{12a}$$

$$p^d(\vec{x}_S, \vec{x}'_R, t) \rightarrow p^d(\vec{x}_S, \vec{x}'_R, \omega) \tag{12b}$$

The sets of interpolated and regularized up-going pressure data and down-going pressure data in the s-f domain are used to calculate a seismic image using an image condition. The up-going pressure wavefield may be decomposed into primaries and multiples as follows:

$$P^u(\vec{x}_S, \vec{x}'_R, \omega) = P^u_p(\vec{x}_S, \vec{x}'_R, \omega) + \sum_{q=1}^{Q} P^u_{m_q}(\vec{x}_S, \vec{x}'_R, \omega) \tag{13a}$$

where $p^u_p(\vec{x}_S, \vec{x}'_R, \omega)$ are the primaries of the up-going pressure wavefield;

$p^u_{m_q}(\vec{x}_S, \vec{x}'_R, \omega)$ are q-th order surface multiple of the up-going wavefield; and Q is the number of multiples.

The down-going pressure wavefield may also be decomposed into primaries and multiples as follows:

$$P^d(\vec{x}_S, \vec{x}'_R, \omega) = \tag{13b}$$
$$P^d_1(\vec{x}_S, \vec{x}'_R, \omega) + P^d_p(\vec{x}_S, \vec{x}'_R, \omega) + \sum_{q=1}^{Q} P^d_{m_q}(\vec{x}_S, \vec{x}'_R, \omega)$$

where $p^d_1(\vec{x}_S, \vec{x}'_R, \omega)$ are a direct down-going point source wavefield;

$p^d_p(\vec{x}_S, \vec{x}'_R, \omega)$ are the primaries of the down-going pressure wavefield; and $p^d_{m_q}(\vec{x}_S, \vec{x}'_R, \omega)$ are q-th order surface multiple of the down-going wavefield.

In migration (i.e., seismic imaging), the down-going pressure wavefield $P^d(\vec{x}_S, \vec{x}'_R, \omega)$ may be referred to as an input for a source wavefield, and the up-going pressure wavefield $P^u(\vec{x}_S, \vec{x}'_R, \omega)$ may be referred to as an input for a receiver wavefield. Different primary and multiple components in $P^u(\vec{x}_S, \vec{x}'_R, \omega)$ and $P^d(\vec{x}_S, \vec{x}'_R, \omega)$ as represented in Equations (13a) and (13b) may be combined during migration to generate a seismic image of a subterranean formation. An image value at each pixel of the seismic image is calculated at a grid point of the migration grid from the down-going pressure wavefield $P^d(\vec{x}_S, \vec{x}'_R, \omega)$ as a source wavefield and the up-going pressure wavefield $P^u(\vec{x}_S, \vec{x}'_R, \omega)$ as a receiver wavefield as follows:

$$I(\vec{x}) = \sum_{\omega} \sum_{\vec{x}_S} \sum_{\vec{x}_R} \hat{G}(\vec{x}, \vec{x}'_S, \omega) \hat{P}^d(\vec{x}_S, \vec{x}'_R, \omega) G(\vec{x}, \vec{x}'_R, \omega) P^u(\vec{x}_S, \vec{x}'_R, \omega) \tag{14}$$

where $\vec{x} = (x, y, z)$ is a grid point in the migration grid;

"^" represents complex conjugate;

$G(\vec{x}, \vec{x}'_S, \omega)$ is a Green's function from a source at the free surface to the grid point $\vec{x}$; and $G(\vec{x}, \vec{x}'_R, \omega)$ is a Green's function from a receiver at the free surface to the grid point $\vec{x}$.

The quantity $I(\vec{x})$ in Equation (14) is an image value of the seismic image at the grid point $\vec{x}$ of the migration grid. In other words, migration generates pixels of a seismic image by calculating the image value $I(\vec{x})$ according to Equation (14) at each grid point $\vec{x}$ of the migration grid. Each pixel of the seismic image comprises a grid point $\vec{x}$ and an image value $I(\vec{x})$.

Figure 14:
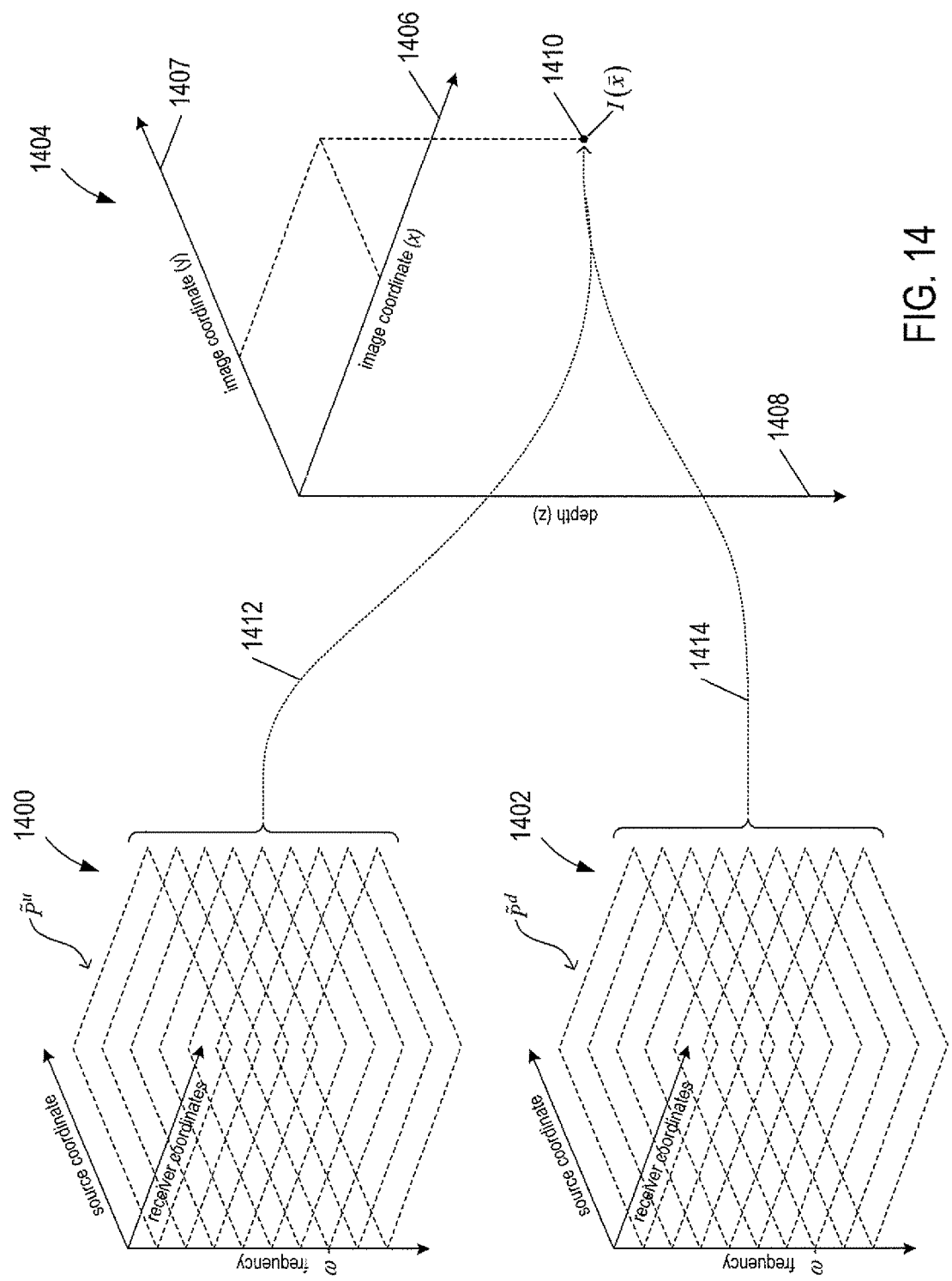
FIG. 14 shows calculation of a seismic image from a set of interpolated and regularized up-going pressure data and a set of interpolated and regularized down-going pressure data.

FIG. 14 shows calculation of a seismic image from a set of interpolated and regularized up-going pressure data 1400 and a set of interpolated and regularized down-going pressure data 1402 in the s-f domain. FIG. 14 also show a seismic image coordinate system 1404. Directional arrows 1406-1408 represents the x-, y-, and z-axes of the seismic image coordinate system 1404. Point 1410 represents a grid point $\vec{x}$. Dotted lines 1412 and 1414 represent using the entire set of up-going pressure data $\tilde{P}_u$ and the entire of set of down-going pressure data $\tilde{P}_d$ in Equation (12) to calculate an image value $I(\vec{x})$ of a seismic image at the grid point $\vec{x}$ 1410. The image value $I(\vec{x})$ and the grid point $\vec{x}$ 1410 are a pixel of the seismic image. An image values may be calculated for each grid point of the image coordinate system 1404 to form a seismic image of a subterranean formation.

Correlation-based imaging with multiples can generate crosstalk. Crosstalk effects may be created when source wavefields (i.e., down-going pressure wavefield $P^d(\vec{x}_S, \vec{x}'_R, \omega)$) and receiver wavefield (i.e., up-going pressure wavefield $P^u(\vec{x}_S, \vec{x}'_R, \omega)$) are in phase at locations with a subterranean formation that are not the same location as a subterranean formation interface. The amount of error created by crosstalk depends on the location of the boundary receiver wavefield and if it is surface consistent, making the crosstalk artifacts from different shot records incoherent. Adding fold by receiver wavefield interpolation and regularization may attenuate the incoherent crosstalk artifacts during migration. By using the interpolated and regularized receive wavefield (i.e., up-going pressure wavefield $P^u(\vec{x}_S, \vec{x}'_R, \omega)$) for multiples migration, the coherent signal component is improved by stacking and the adverse effects of incoherent crosstalk artifacts are weakened.

Figure 15:
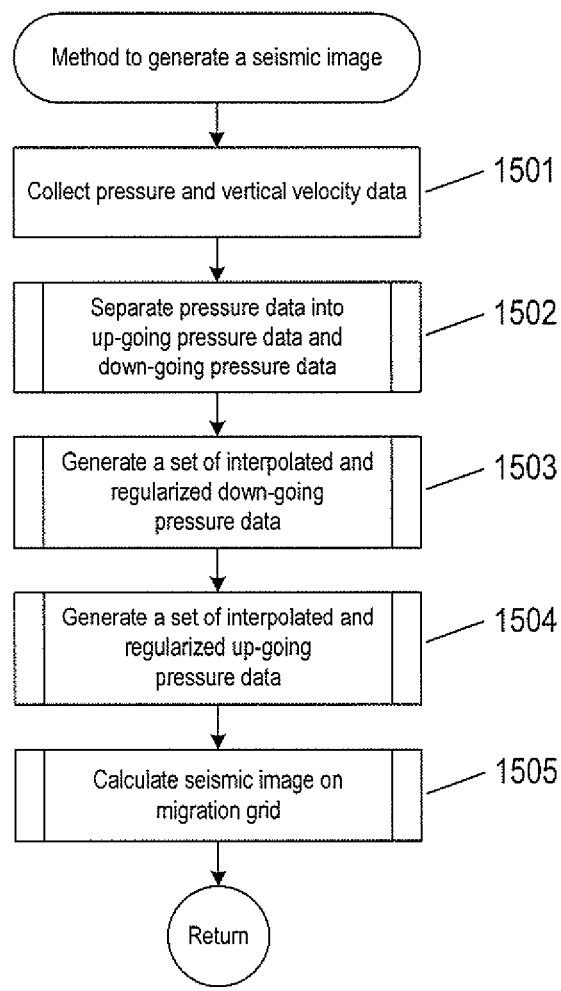
FIG. 15 shows a flow diagram of a method to generate a seismic image.

FIG. 15 shows a flow diagram of a method to generate a seismic image. In block 1501, a set of pressure data and a set of vertical velocity data generated by collocated pressure and particle motion sensors of a seismic data acquisition system are received. In block 1502, a routine to "separate pressure data into up-going pressure data and down-going pressure data wavefield" based on the set of pressure data and the set of vertical velocity data is called. In block 1503, a routine "generate a set of interpolated and regularized down-going pressure data" at grid points of a migration grid is called. In block 1504, a routine "generate a set of interpolated and regularized up-going pressure data" at grid points of the same migration grid is called. In block 1505, a routine "calculate seismic image on migration grid" is called to calculate a seismic image based on the regularized and interpolated down-going and up-going pressure data.

Figure 16:
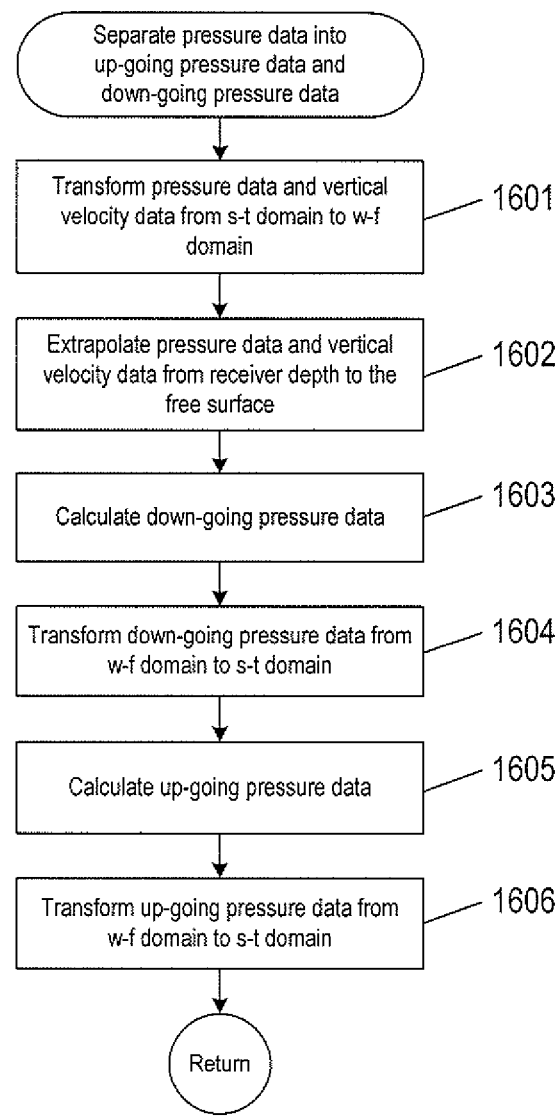
FIG. 16 shows a flow diagram of the method to "separate pressure data into up-going pressure data and down-going pressure data" called in FIG. 15.

FIG. 16 shows a flow diagram of the method to "separate pressure data into up-going pressure data and down-going pressure data" called in block 1502 of FIG. 15. In block 1601, the set of pressure data and the set of vertical velocity data are transformed from the s-t domain to the w-f domain as described with reference to Equations (3a) and (3b). In block 1602, the sets of pressure and vertical velocity data are extrapolated from receiver depth to the level of the free surface, as described above with reference to FIG. 5 and Equations (4a) and (4b). In block 1603, a set of down-going pressure data is calculated from the set of pressure data and the set of vertical velocity data as described above with reference to Equation (6a). In block 1604, the set of down-going pressure data is transformed back to the s-t domain, a described above with reference to Equation (8a). In block 1605, a set of up-going pressure data is calculated from the set of pressure data and the set of vertical velocity data as described above with reference to Equation (6b). In block 1604, the set of up-going pressure data is transformed back to the s-t domain, a described above with reference to Equation (8b).

Figure 17:
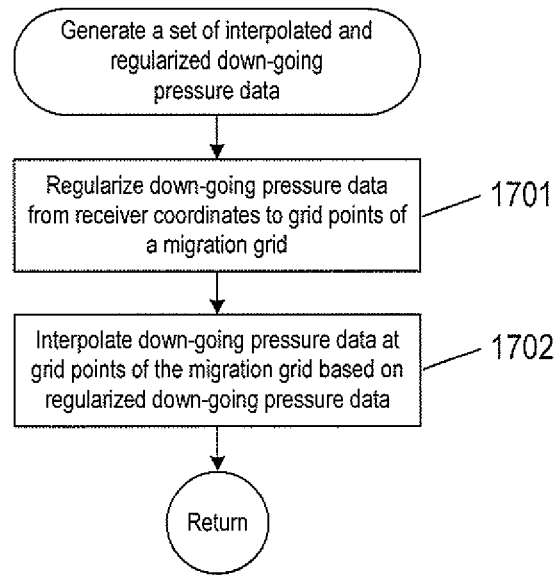
FIG. 17 shows a flow diagram of the method "generate a set of interpolated and regularized down-going pressure data" called in FIG. 15.

FIG. 17 shows a flow diagram of the method "generate a set of interpolated and regularized down-going pressure data" called in block 1503 of FIG. 15. In block 1701, irregular receiver coordinates of the down-going pressure data are regularized to grid points of the migration grid, as described above with reference to FIGS. 10A-10B. In block 1702, down-going pressure data is interpolated at grid points of the migration grid from the down-going pressure data regularized to grid points of migration grid to generate a set of interpolated and regularized down-going pressure data at grid points of the migration grid, as described above with reference to FIGS. 11A-11C.

Figure 18:
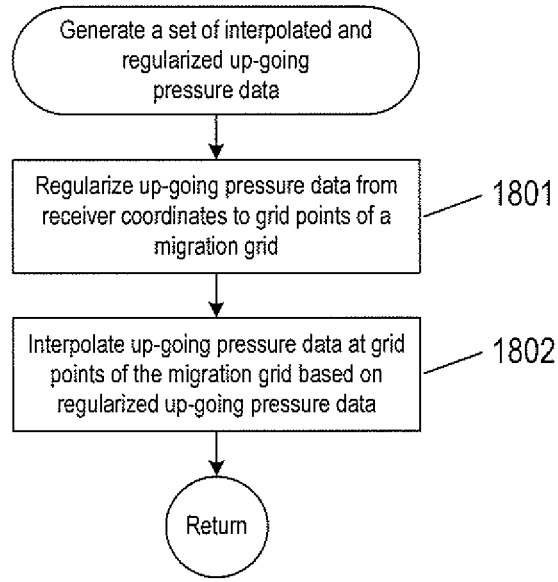
FIG. 18 shows a flow diagram of the method "generate a set of interpolated and regularized up-going pressure data" called in FIG. 15.

FIG. 18 shows a flow diagram of the method "generate a set of interpolated and regularized up-going pressure data" called in block 1504 of FIG. 15. In block 1801, irregular receiver coordinates of the up-going pressure data are regularized to grid points of the migration grid, as described above with reference to FIGS. 10A-10B. In block 1802, up-going pressure data is interpolated at grid points of the migration grid from the up-going pressure data regularized to grid points of migration grid to generate a set of interpolated and regularized up-going pressure data at grid points of the migration grid, as described above with reference to FIGS. 11A-11C.

Figure 19:
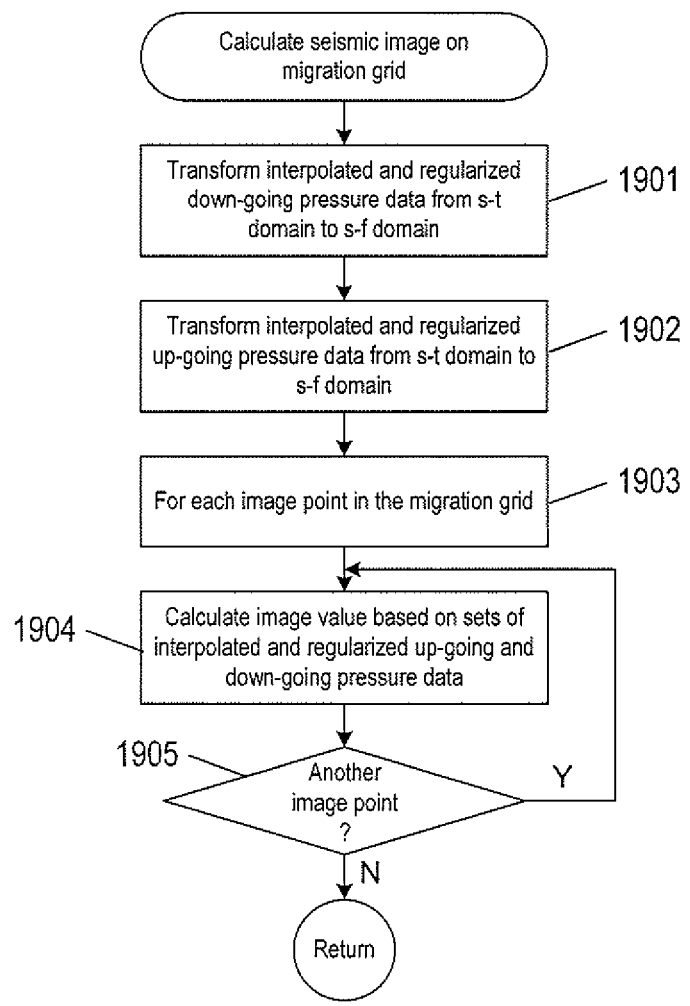
FIG. 19 shows a control-flow diagram of the method "calculate seismic image on migration grid" called in FIG. 15.

FIG. 19 shows a control-flow diagram of the method "calculate seismic image on migration grid" called in block 1505 of FIG. 15. In block 1901, the set of interpolated and regularized down-going pressure data is transformed from the s-t domain to the s-f domain, as described above with reference to Equation (12b). In block 1902, the set of interpolated and regularized up-going pressure data is transformed from the s-t domain to the s-f domain, as described above with reference to Equation (12a). A for-loop beginning with block 1903 repeats the calculation of block 1904 for each grid point of the migration grid. In block 1904, an seismic image value is calculated according to Equation (14) at a grid point, as described above with reference to Equation (14) and represented in FIG. 14. In decision block 1905, the calculation represented by block 1904 is repeated.

Figure 20:
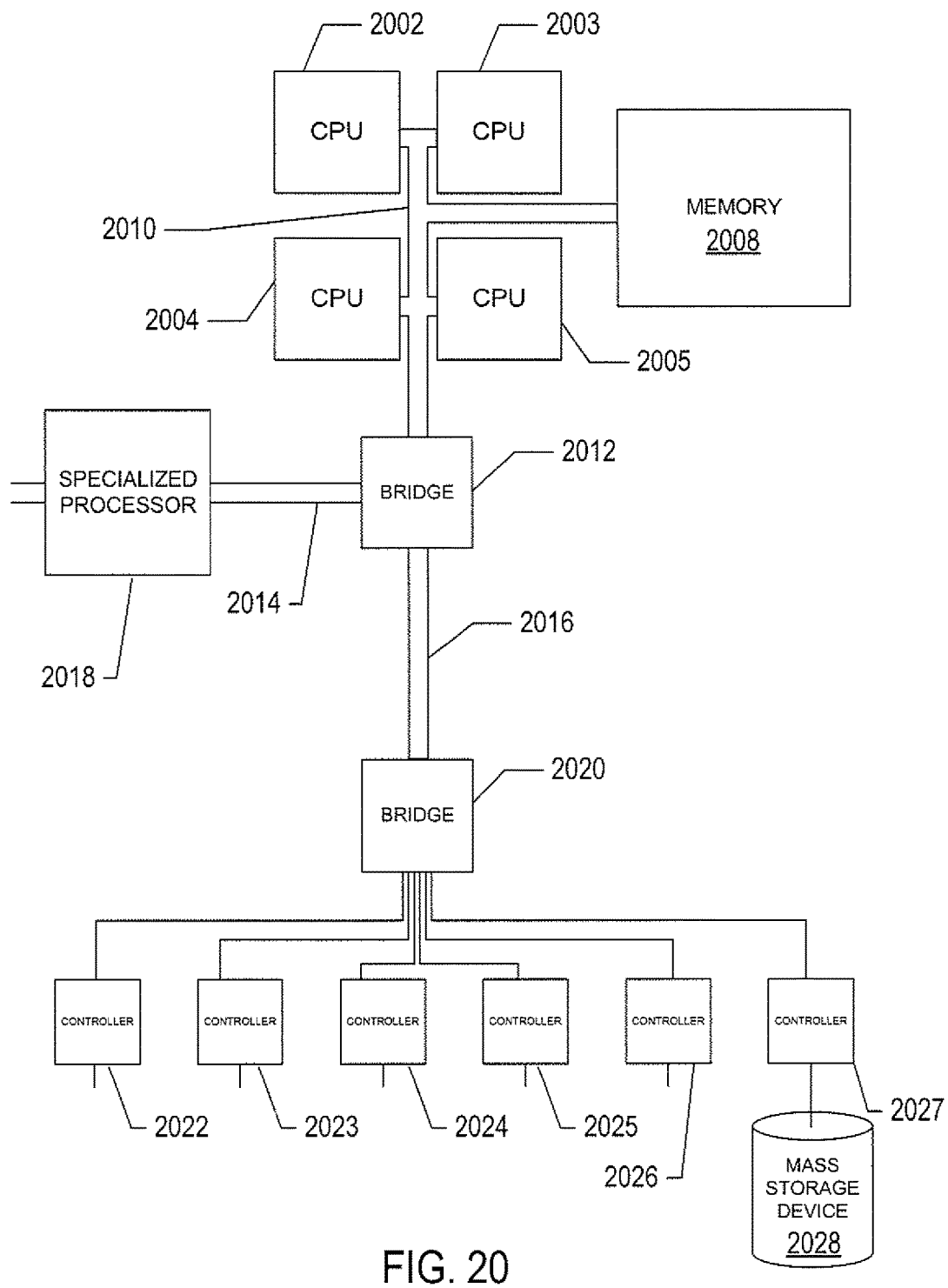
FIG. 20 shows an example of a computer system that executes methods of calculating a seismic image.

FIG. 20 shows an example of a computer system that executes efficient methods of calculating a seismic image and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 2002-2005, one or more electronic memories 2008 interconnected with the CPUs by a CPU/memory-subsystem bus 2010 or multiple busses, a first bridge 2012 that interconnects the CPU/memory-subsystem bus 2010 with additional busses 2014 and 2016, or other types of high-speed interconnection media, including multiple, high-speed serial interconnects. The busses or serial interconnections, in turn, connect the CPUs and memory with specialized processors, such as a graphics processor 2018, and with one or more additional bridges 2020, which are interconnected with high-speed serial links or with multiple controllers 2022-2027, such as controller 2027, that provide access to various different types of computer-readable media, such as computer-readable medium 2028, electronic displays, input devices, and other such components, subcomponents, and computational resources. The electronic displays, including visual display screen, audio speakers, and other output devices, including mice, keyboards, touch screens, and other such input interfaces, together constitute input and output interfaces that allow the computer system to interact with human users. Computer-readable medium 2028 is a data-storage device, including electronic memory, optical or magnetic disk drive, USB drive, flash memory and other such data-storage device. The computer-readable medium 2028 can be used to store machine-readable instructions that encode the computational methods described above and can be used to store encoded data, during store operations, and from which encoded data can be retrieved, during read operations, by computer systems, data-storage systems, and peripheral devices.

Figures 21A, 21B:
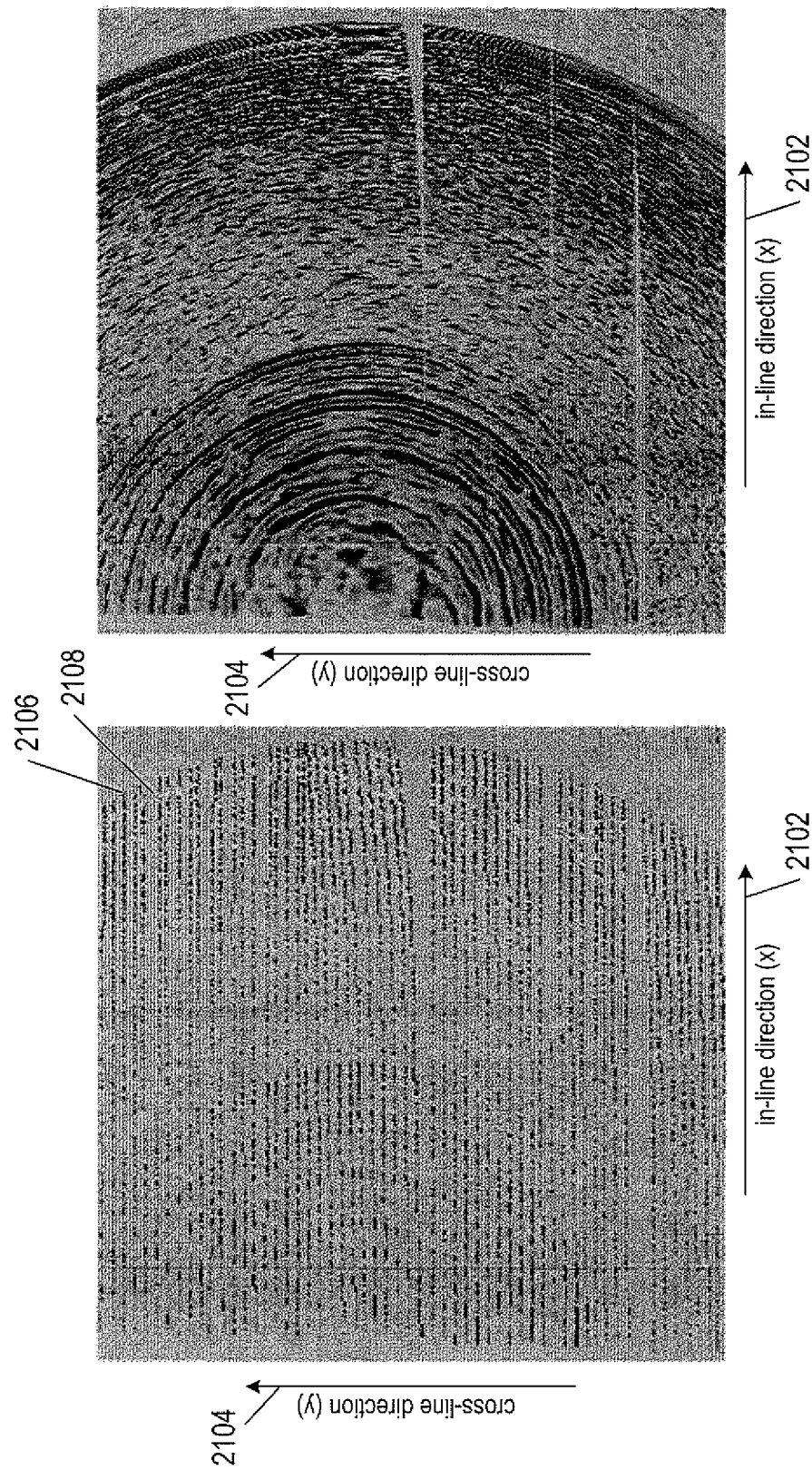
FIGS. 21A-21B show a time slice of a common-shot gather before and after interpolation.

FIGS. 21A-21B show a time slice of a common-shot gather before (FIG. 21A) and after interpolation (FIG. 21B). In FIGS. 21A-21B, horizontal axis 2102 represents the in-line direction and vertical axis 2104 represents the cross-line direction. In FIG. 21A, lines of common-shot seismic data, such as line of seismic data 2106, are separate by gaps 2108 that correspond to larger cross-line separation distances (e.g., about 75-100 meters) between adjacent streamers as compared to much short separation distances between receivers located along the streamers (e.g., about 12.5 meters). FIG. 21B reveals how regularization and interpolation using an anti-leakage Fourier transform filled in the gaps between receivers in the cross-line direction.

Figure 22A:
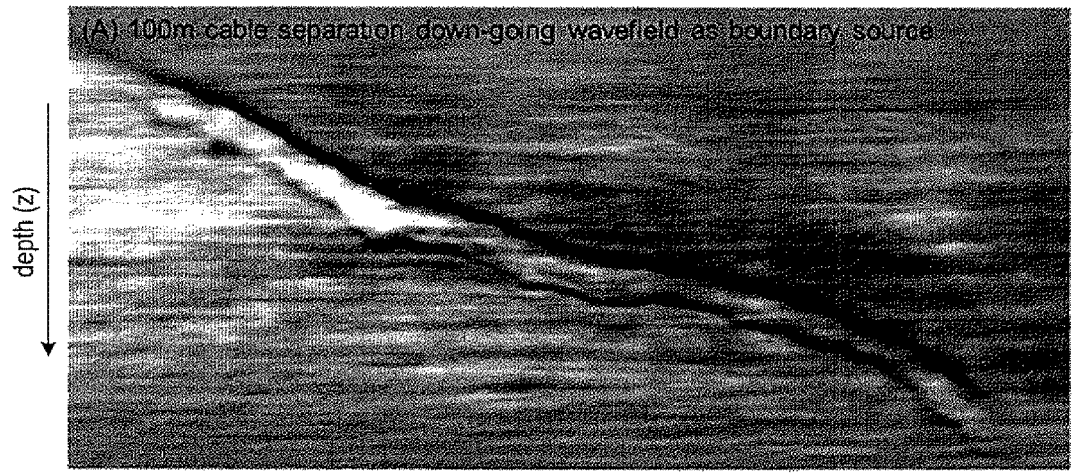
FIGS. 22A-22B show depth slices of seismic images generated using a source wavefield without and with regularization and interpolation.
Figure 22B:

FIGS. 22A-22B show depth slices of seismic images generated using a source wavefield without regularization and interpolation (FIG. 22A) and using a source wavefield with regularization and interpolation (FIG. 22B). In FIG. 22A, the streamers are separated by 100 meters. In FIG. 22B, interpolation has been used to generate interpolated seismic data at 25 meters spacings between streamers. FIG. 22B shows a higher-resolution and higher signal-to-noise seismic image than the seismic image shown in FIG. 22A.

Figure 23A:
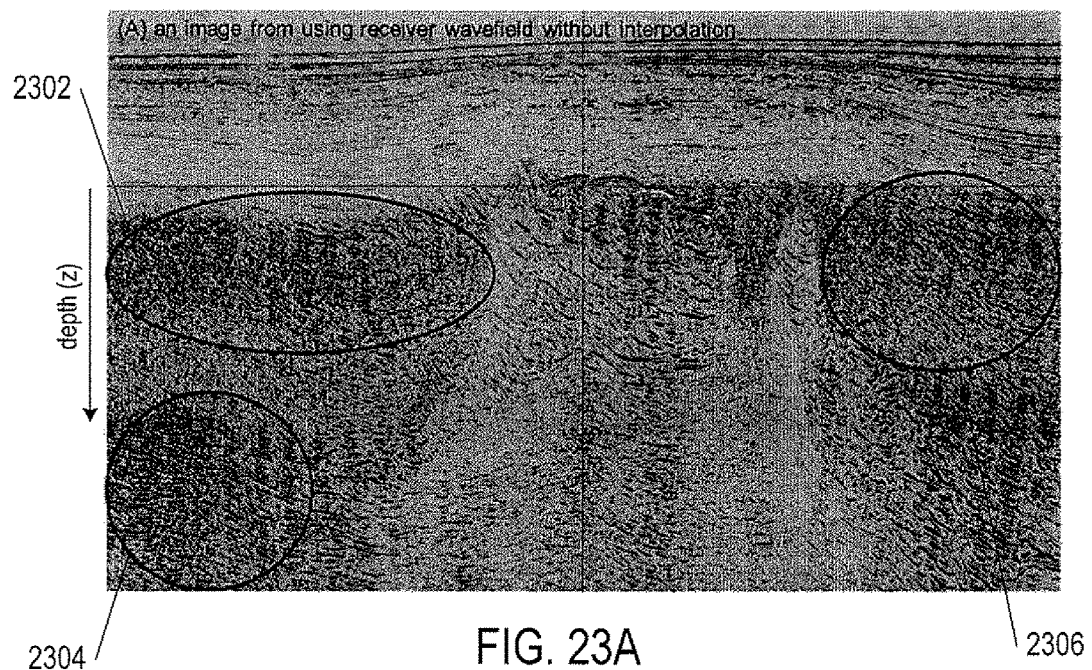
FIGS. 23A-23B show depth slices of seismic images generated using a receiver wavefield without and with regularization and interpolation.
Figure 23B:
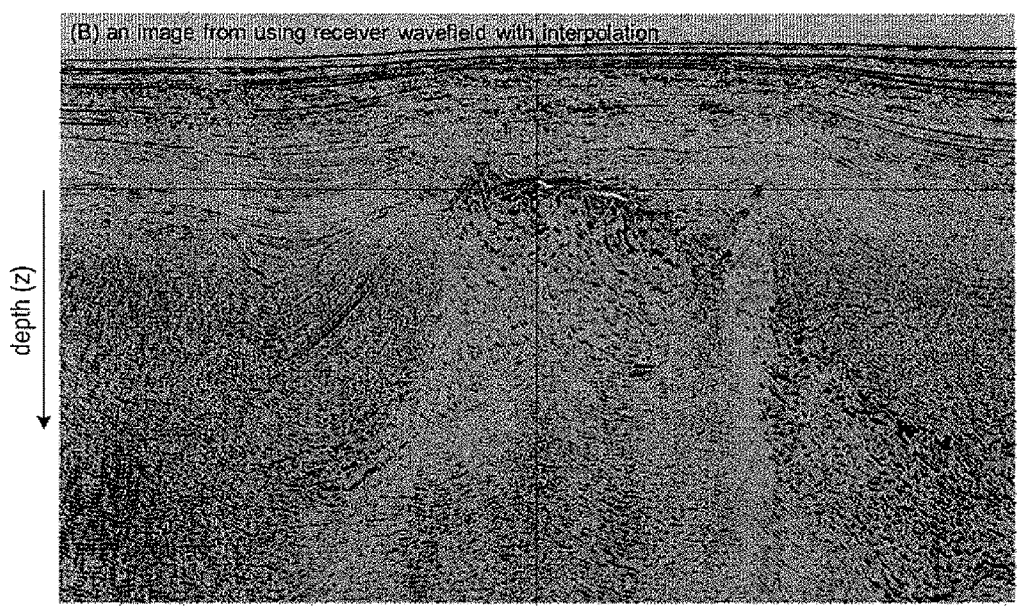

FIGS. 23A-23B show depth slices of seismic images generated using a receiver wavefield without regularization and interpolation (FIG. 23A) and using a receiver wavefield with regularization and interpolation (FIG. 23B). Receiver wavefield interpolation and regularization attenuates cross-talk artifacts. For example, circled regions 2302, 2304, and 2306 identify regions that display crosstalk artifacts. In FIG. 23B, the crosstalk artifacts are removed as a result receiver wavefield regularization and interpolation. FIG. 23B shows a higher-resolution seismic image than the seismic image shown in FIG. 23A.

The methods and systems described above produce high-resolution seismic images of a subterranean formation with seismic data that records both primaries and multiples. The high-resolution seismic images may, in turn, be used to determine the structure of the subterranean formation. In particular, the structural information may reveal how different rock, sediment, and hydrocarbon deposits are organized within the formation, may reveal the location of possible hydrocarbon deposits, and may be used to monitor existing hydrocarbon deposits during production.

The methods and systems described above may be used to manufacture a geophysical data product indicative of certain properties of a subterranean formation. The geophysical data product may include geophysical data such as pressure data, particle motion data, particle velocity data, particle acceleration data, and any seismic image that results from using the methods and systems described above. The geophysical data product may be stored on a non-transitory computer-readable medium as described above. The geophysical data product may be produced offshore (i.e., by equipment on the survey vessel 102) or onshore (i.e., at a computing facility on land) either within the United States or in another country. When the geophysical data product is produced offshore or in another country, it may be imported onshore to a data-storage facility in the United States. Once onshore in the United States, geophysical analysis may be performed on the geophysical data product.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but will be accorded the widest scope consistent with the principles and novel features disclosed herein.

The invention claimed is:

1. In a process for generating a seismic image of a subterranean formation using marine seismic techniques in which a source is activated above the subterranean formation and the reflections from the subterranean formation are recorded as pressure and vertical velocity data generated by receivers, the specific improvement comprising:
   separating the recorded pressure data into up-going pressure data and down-going pressure data based on the recorded pressure data and the recorded vertical velocity data;
   generating interpolated and regularized down-going pressure data at grid points of a migration grid based on the down-going pressure data;
   generating interpolated and regularized up-going pressure data at grid points of the migration grid based on the up-going pressure data; and
   generating a seismic image of the subterranean formation at grid points of the migration grid based on the interpolated and regularized down-going pressure data and the interpolated and regularized up-going pressure data, thereby enhancing the seismic image by revealing structures of the subterranean formation with attenuated noise and attenuated crosstalk artifacts.

2. The process of claim 1, wherein separating the pressure data into the up-going pressure data and the down-going pressure data further comprises:
   transforming the recorded vertical velocity data from the space-time domain to the wavenumber-frequency domain;
   extrapolating receiver coordinates of the recorded pressure data and the recorded vertical velocity data from receiver depth to a free surface level;
   calculating down-going pressure data from the recorded pressure data and the recorded vertical velocity data; and
   calculating up-going pressure data from the recorded pressure data and the recorded vertical velocity data.

3. The process of claim 1, wherein generating the interpolated and regularized down-going pressure data at grid points of the migration grid further comprises:
   regularizing irregular receiver coordinates of the down-going pressure data to regularly spaced grid points of the migration grid; and
   interpolating down-going pressure data at grid points of the migration from the down-going pressure data regularized to grid points of migration grid to generate interpolated and regularized down-going pressure data at grid points of the migration grid.

4. The process of claim 1, wherein generating the interpolated and regularized up-going pressure data at grid points of the migration grid further comprises:
regularizing irregular receiver coordinates of the up-going pressure data to regularly spaced grid points of the migration grid; and
interpolating up-going pressure data at grid points of the migration from the up-going pressure data regularized to grid points of migration grid to generate interpolated and regularized up-going pressure data at grid points of the migration grid.

5. The process of claim 1, wherein generating the seismic image of the subterranean formation further comprises for each grid point in the migration grid, calculating an image value of the seismic image based on the interpolated and regularized down-going pressure data and the interpolated and regularized up-going pressure data.

6. A system that generates a seismic image of a subterranean formation, the system comprising:
one or more processors;
one or more data-storage devices; and
machine-readable instructions stored in the one or more data-storage devices that when executed using the one or more processors controls the system to carry out the operations comprising:
separating recorded pressure data into up-going pressure data and down-going pressure data based on recorded pressure data and recorded vertical velocity data generated by receivers in a marine survey of the subterranean formation and stored in the one or more data-storage devices;
generating interpolated and regularized down-going pressure data at grid points of a migration grid based on the down-going pressure data;
generating interpolated and regularized up-going pressure data at grid points of the migration grid based on the up-going pressure data; and
generating a seismic image of the subterranean formation at grid points of the migration grid based on the interpolated and regularized down-going pressure data and the interpolated and regularized up-going pressure data, the seismic image revealing structures of the subterranean formation with attenuated noise and attenuated crosstalk artifacts.

7. The system of claim 6, wherein separating the pressure data into the up-going pressure data and the down-going pressure data further comprises:
transforming the recorded vertical velocity data from the space-time domain to the wavenumber-frequency domain;
extrapolating receiver coordinates of the recorded pressure data and the recorded vertical velocity data from receiver depth to a free surface level;
calculating down-going pressure data from the recorded pressure data and the recorded vertical velocity data; and
calculating up-going pressure data from the recorded pressure data and the recorded vertical velocity data.

8. The system of claim 6, wherein generating the interpolated and regularized down-going pressure data at grid points of the migration grid further comprises:
regularizing irregular receiver coordinates of the down-going pressure data to regularly spaced grid points of the migration grid; and
interpolating down-going pressure data at grid points of the migration from the down-going pressure data regularized to grid points of migration grid to generate interpolated and regularized down-going pressure data at grid points of the migration grid.

9. The system of claim 6, wherein generating the interpolated and regularized up-going pressure data at grid points of the migration grid further comprises:
regularizing irregular receiver coordinates of the up-going pressure data to regularly spaced grid points of the migration grid; and
interpolating up-going pressure data at grid points of the migration from the up-going pressure data regularized to grid points of migration grid to generate interpolated and regularized up-going pressure data at grid points of the migration grid.

10. The system of claim 6, wherein generating the seismic image of the subterranean formation further comprises for each grid point in the migration grid, calculating an image value of the seismic image based on the interpolated and regularized down-going pressure data and the interpolated and regularized up-going pressure data.

11. A non-transitory computer-readable medium encoded with machine-readable instructions to control one or more processors of a computer system to perform the operations comprising:
separating recorded pressure data into up-going pressure data and down-going pressure data based on recorded pressure data and recorded vertical velocity data generated by receivers in a marine survey of a subterranean formation and stored in the one or more data-storage devices;
generating interpolated and regularized down-going pressure data at grid points of a migration grid based on the down-going pressure data;
generating interpolated and regularized up-going pressure data at grid points of a migration grid based on the up-going pressure data; and
generating a seismic image of the subterranean formation at grid points of the migration grid based on the interpolated and regularized down-going pressure data and the interpolated and regularized up-going pressure data, the seismic image revealing structures of the subterranean formation with attenuated noise and attenuated crosstalk artifacts.

12. The medium of claim 11, wherein separating the pressure data into the up-going pressure data and the down-going pressure data further comprises:
transforming the recorded vertical velocity data from the space-time domain to the wavenumber-frequency domain;
extrapolating receiver coordinates of the recorded pressure data and the recorded vertical velocity data from receiver depth to a free surface level;
calculating down-going pressure data from the recorded pressure data and the recorded vertical velocity data; and
calculating up-going pressure data from the recorded pressure data and the recorded vertical velocity data.

13. The medium of claim 11, wherein generating the interpolated and regularized down-going pressure data at grid points of the migration grid further comprises:
regularizing irregular receiver coordinates of the down-going pressure data to regularly spaced grid points of the migration grid; and
interpolating down-going pressure data at grid points of the migration from the down-going pressure data regularized to grid points of migration grid to generate interpolated and regularized down-going pressure data at grid points of the migration grid.

14. The medium of claim 11, wherein generating the interpolated and regularized up-going pressure data at grid points of the migration grid further comprises:
regularizing irregular receiver coordinates of the up-going pressure data to regularly spaced grid points of the migration grid; and
interpolating up-going pressure data at grid points of the migration from the up-going pressure data regularized to grid points of migration grid to generate interpolated and regularized up-going pressure data at grid points of the migration grid.

15. The medium of claim 11, wherein generating the seismic image of the subterranean formation further comprises for each grid point in the migration grid, calculating an image value of the seismic image based on the interpolated and regularized down-going pressure data and the interpolated and regularized up-going pressure data.

16. A method to manufacture a geophysical data product, the method comprising:
obtaining pressure and vertical velocity data recorded in a marine survey of a subterranean formation;
separating the recorded pressure data into up-going pressure data and down-going pressure data based on the recorded pressure data and the recorded vertical velocity data;
generating interpolated and regularized down-going pressure data at grid points of a migration grid based on the down-going pressure data;
generating interpolated and regularized up-going pressure data at grid points of the migration grid based on the up-going pressure data;
generating a seismic image of the subterranean formation at grid points of the migration grid based on the interpolated and regularized down-going pressure data and the interpolated and regularized up-going pressure data; and
recording the seismic image on one or more non-transitory computer-readable media, thereby creating the geophysical data product.

\* \* \* \* \*